US012670740B2

(12) United States Patent
Ghafoor et al.

(10) Patent No.: US 12,670,740 B2
(45) Date of Patent: *Jun. 30, 2026

(54) IMAGE ANALYSIS USING NEURAL NETWORKS FOR POSE AND ACTION IDENTIFICATION

(71) Applicant: STANDARD COGNITION, CORP., San Francisco, CA (US)

(72) Inventors: Razwan Ghafoor, Sutton Coldfield (GB); Peter Rennert, Dunblane (GB); Hichame Moriceau, London (GB)

(73) Assignee: STANDARD COGNITION, CORP., San Francisco, CA (US)

( * ) Notice: Subject to any disclaimer, the term of this patent is extended or adjusted under 35 U.S.C. 154(b) by 296 days.

This patent is subject to a terminal disclaimer.

(21) Appl. No.: 18/380,591

(22) Filed: Oct. 16, 2023

(65) Prior Publication Data

US 2024/0037977 A1    Feb. 1, 2024

Related U.S. Application Data

(63) Continuation of application No. 17/388,260, filed on Jul. 29, 2021, now Pat. No. 11,790,682, which is a
(Continued)

(30) Foreign Application Priority Data

Mar. 10, 2017    (GB) ...................................... 1703914

(51) Int. Cl.
*G06V 40/10* (2022.01)

(52) U.S. Cl.
CPC .................................. *G06V 40/103* (2022.01)

(58) Field of Classification Search
CPC .............................. G06V 40/103; G06V 40/20
See application file for complete search history.

(56) References Cited

U.S. PATENT DOCUMENTS 6,154,559 A    11/2000    Beardsley
6,236,736 B1    5/2001    Crabtree et al.
(Continued)

FOREIGN PATENT DOCUMENTS

CN    104850846 A    8/2015
CN    105069413 A    11/2015
(Continued)

OTHER PUBLICATIONS

Khan et al., "Skin detection: A random forest approach", Proceedings of 2010 IEEE 17th International Conference on Image Processing, Sep. 26-29, 2010, pp. 4613-4616.
(Continued)

*Primary Examiner* — Ming Y Hon
(74) *Attorney, Agent, or Firm* — Haynes Beffel & Wolfeld LLP; Andrew L. Dunlap; Hannah W. Powell

(57) ABSTRACT

An apparatus for performing image analysis to identify human actions represented in an image, comprising: a joint-determination module configured to analyse an image depicting one or more people using a first computational neural network to determine a set of joint candidates for the one or more people depicted in the image; a pose estimation module configured to derive pose estimates from the set of joint candidates that estimate a body configuration for the one or more people depicted in the image; and an action-identification module configured to analyse a region of interest within the image identified from the derived pose estimates using a second computational neural network to identify an action performed by a person depicted in the image.

17 Claims, 9 Drawing Sheets

Related U.S. Application Data continuation of application No. 16/492,781, filed as application No. PCT/GB2018/050614 on Mar. 9, 2018, now abandoned.

(56) References Cited

U.S. PATENT DOCUMENTS

| | | | |
|---|---|---|---|
| 6,561,417 B1 | 5/2003 | Gadd | |
| 7,050,624 B2 | 5/2006 | Dialameh et al. | |
| 7,050,652 B2 | 5/2006 | Stanek | |
| 7,742,623 B1 | 6/2010 | Moon et al. | |
| 8,009,863 B1 | 8/2011 | Sharma et al. | |
| 8,098,888 B1 | 1/2012 | Mummareddy et al. | |
| 8,219,438 B1 | 7/2012 | Moon et al. | |
| 8,261,256 B1 | 9/2012 | Adler et al. | |
| 8,279,325 B2 | 10/2012 | Pitts et al. | |
| 8,577,705 B1 | 11/2013 | Baboo et al. | |
| 8,624,725 B1 | 1/2014 | MacGregor | |
| 8,749,630 B2 | 6/2014 | Alahi et al. | |
| 9,036,028 B2 | 5/2015 | Buehler | |
| 9,058,523 B2 | 6/2015 | Merkel et al. | |
| 9,124,778 B1 | 9/2015 | Crabtree | |
| 9,256,807 B1 | 2/2016 | Shlens et al. | |
| 9,262,681 B1 | 2/2016 | Mishra | |
| 9,269,012 B2 | 2/2016 | Fotland | |
| 9,269,093 B2 | 2/2016 | Lee et al. | |
| 9,294,873 B1 | 3/2016 | MacGregor | |
| 9,449,233 B2 | 9/2016 | Taylor | |
| 9,489,623 B1 | 11/2016 | Sinyavskiy et al. | |
| 9,494,532 B2 | 11/2016 | Xie et al. | |
| 9,536,177 B2 | 1/2017 | Chalasani et al. | |
| 9,582,891 B2 | 2/2017 | Geiger et al. | |
| 9,595,127 B2 | 3/2017 | Champion et al. | |
| 9,652,751 B2 | 5/2017 | Aaron et al. | |
| 9,846,810 B2 | 12/2017 | Partis | |
| 9,881,221 B2 | 1/2018 | Bala et al. | |
| 9,886,827 B2 | 2/2018 | Schoner | |
| 9,911,290 B1 | 3/2018 | Zalewski et al. | |
| 10,026,116 B2 | 7/2018 | Zohar et al. | |
| 10,055,853 B1 | 8/2018 | Fisher et al. | |
| 10,083,453 B2 | 9/2018 | Campbell | |
| 10,127,438 B1 | 11/2018 | Fisher et al. | |
| 10,133,933 B1 * | 11/2018 | Fisher | G06V 20/41 |
| 10,165,194 B1 | 12/2018 | Baldwin | |
| 10,169,677 B1 | 1/2019 | Ren et al. | |
| 10,175,340 B1 | 1/2019 | Abari et al. | |
| 10,176,452 B2 | 1/2019 | Rizzolo et al. | |
| 10,192,408 B2 | 1/2019 | Schoner | |
| 10,202,135 B2 | 2/2019 | Mian et al. | |
| 10,210,603 B2 | 2/2019 | Venable et al. | |
| 10,210,737 B2 | 2/2019 | Zhao | |
| 10,217,120 B1 | 2/2019 | Shin et al. | |
| 10,242,393 B1 | 3/2019 | Kumar et al. | |
| 10,262,331 B1 | 4/2019 | Sharma et al. | |
| 10,282,720 B1 | 5/2019 | Buibas et al. | |
| 10,282,852 B1 | 5/2019 | Buibas et al. | |
| 10,318,917 B1 | 6/2019 | Goldstein et al. | |
| 10,332,089 B1 | 6/2019 | Asmi et al. | |
| 10,354,262 B1 | 7/2019 | Hershey et al. | |
| 10,373,322 B1 | 8/2019 | Buibas et al. | |
| 10,387,896 B1 | 8/2019 | Hershey et al. | |
| 10,438,164 B1 | 10/2019 | Xiong et al. | |
| 10,438,277 B1 | 10/2019 | Jiang et al. | |
| 10,445,694 B2 | 10/2019 | Fisher et al. | |
| 10,474,877 B2 | 11/2019 | Huang et al. | |
| 10,474,988 B2 | 11/2019 | Fisher et al. | |
| 10,474,991 B2 | 11/2019 | Fisher et al. | |
| 10,474,992 B2 | 11/2019 | Fisher et al. | |
| 10,474,993 B2 | 11/2019 | Fisher et al. | |
| 10,529,137 B1 * | 1/2020 | Black | G06V 20/653 |
| 10,535,146 B1 | 1/2020 | Buibas et al. | |
| 10,650,545 B2 | 5/2020 | Fisher et al. | |
| 10,776,926 B2 | 9/2020 | Shrivastava | |
| 10,810,539 B1 | 10/2020 | Mohanty et al. | |
| 10,853,965 B2 | 12/2020 | Fisher et al. | |
| 11,132,810 B2 | 9/2021 | Kume et al. | |
| 11,790,682 B2 * | 10/2023 | Ghafoor | G06V 40/103 382/156 |
| 2001/0049690 A1 | 12/2001 | McConnell et al. | |
| 2003/0078849 A1 | 4/2003 | Snyder | |
| 2003/0107649 A1 | 6/2003 | Flickner et al. | |
| 2003/0154141 A1 | 8/2003 | Capazario et al. | |
| 2004/0099736 A1 | 5/2004 | Neumark | |
| 2004/0131254 A1 | 7/2004 | Liang et al. | |
| 2005/0177446 A1 | 8/2005 | Hoblit | |
| 2005/0201612 A1 | 9/2005 | Park et al. | |
| 2006/0132491 A1 | 6/2006 | Riach et al. | |
| 2006/0195370 A1 | 8/2006 | Howarth | |
| 2006/0279630 A1 | 12/2006 | Aggarwal et al. | |
| 2007/0021863 A1 | 1/2007 | Mountz et al. | |
| 2007/0021864 A1 | 1/2007 | Mountz et al. | |
| 2007/0182718 A1 | 8/2007 | Schoener et al. | |
| 2007/0282665 A1 | 12/2007 | Buehler et al. | |
| 2008/0001918 A1 | 1/2008 | Hsu et al. | |
| 2008/0159634 A1 | 7/2008 | Sharma et al. | |
| 2008/0170776 A1 | 7/2008 | Albertson et al. | |
| 2008/0181507 A1 | 7/2008 | Gope et al. | |
| 2008/0208698 A1 | 8/2008 | Olson et al. | |
| 2008/0211915 A1 | 9/2008 | McCubbrey | |
| 2008/0243614 A1 | 10/2008 | Tu et al. | |
| 2009/0041297 A1 | 2/2009 | Zhang et al. | |
| 2009/0057068 A1 | 3/2009 | Lin et al. | |
| 2009/0083815 A1 | 3/2009 | McMaster et al. | |
| 2009/0217315 A1 | 8/2009 | Malik et al. | |
| 2009/0222313 A1 | 9/2009 | Kannan et al. | |
| 2009/0268028 A1 | 10/2009 | Ikumi et al. | |
| 2009/0307226 A1 | 12/2009 | Koster et al. | |
| 2010/0021009 A1 | 1/2010 | Yao | |
| 2010/0103104 A1 | 4/2010 | Son et al. | |
| 2010/0208941 A1 | 8/2010 | Broaddus et al. | |
| 2010/0217678 A1 | 8/2010 | Goncalves | |
| 2010/0283860 A1 | 11/2010 | Nader | |
| 2011/0141011 A1 | 6/2011 | Lashina et al. | |
| 2011/0209042 A1 | 8/2011 | Porter | |
| 2011/0228976 A1 | 9/2011 | Fitzgibbon et al. | |
| 2011/0317012 A1 | 12/2011 | Hammadou | |
| 2011/0317016 A1 | 12/2011 | Saeki et al. | |
| 2011/0317871 A1 * | 12/2011 | Tossell | G06V 40/23 382/103 |
| 2011/0320322 A1 | 12/2011 | Roslak et al. | |
| 2012/0119879 A1 | 5/2012 | Estes et al. | |
| 2012/0159290 A1 | 6/2012 | Pulsipher et al. | |
| 2012/0206337 A1 | 8/2012 | Hildreth et al. | |
| 2012/0209749 A1 | 8/2012 | Hammad et al. | |
| 2012/0245974 A1 | 9/2012 | Bonner et al. | |
| 2012/0271712 A1 | 10/2012 | Katzin et al. | |
| 2012/0275686 A1 | 11/2012 | Wilson et al. | |
| 2012/0290401 A1 | 11/2012 | Neven | |
| 2013/0011007 A1 | 1/2013 | Muriello et al. | |
| 2013/0011049 A1 | 1/2013 | Kimura | |
| 2013/0076898 A1 | 3/2013 | Philippe et al. | |
| 2013/0156260 A1 | 6/2013 | Craig | |
| 2013/0182114 A1 | 7/2013 | Zhang et al. | |
| 2013/0201339 A1 | 8/2013 | Venkatesh | |
| 2014/0168477 A1 | 6/2014 | David | |
| 2014/0188648 A1 | 7/2014 | Argue et al. | |
| 2014/0207615 A1 | 7/2014 | Li et al. | |
| 2014/0219550 A1 | 8/2014 | Popa et al. | |
| 2014/0222501 A1 | 8/2014 | Hirakawa et al. | |
| 2014/0282162 A1 | 9/2014 | Fein et al. | |
| 2014/0285660 A1 | 9/2014 | Jamtgaard et al. | |
| 2014/0304123 A1 | 10/2014 | Schwartz | |
| 2015/0002675 A1 | 1/2015 | Kundu et al. | |
| 2015/0009323 A1 | 1/2015 | Lei | |
| 2015/0012396 A1 | 1/2015 | Puerini et al. | |
| 2015/0019391 A1 * | 1/2015 | Kumar | G06Q 10/087 705/28 |
| 2015/0026010 A1 | 1/2015 | Ellison | |
| 2015/0026646 A1 | 1/2015 | Ahn et al. | |
| 2015/0029339 A1 | 1/2015 | Kobres et al. | |
| 2015/0039458 A1 | 2/2015 | Reid | |
| 2015/0049914 A1 | 2/2015 | Alves | |
| 2015/0124107 A1 | 5/2015 | Muriello et al. | |
| 2015/0193761 A1 | 7/2015 | Svetal | |
| 2015/0206188 A1 | 7/2015 | Tanigawa et al. | |

(56) References Cited

U.S. PATENT DOCUMENTS

| | | | |
|---|---|---|---|
| 2015/0208043 A1 | 7/2015 | Lee et al. | |
| 2015/0213391 A1 | 7/2015 | Hasan | |
| 2015/0221094 A1 | 8/2015 | Marcheselli et al. | |
| 2015/0262116 A1 | 9/2015 | Katircioglu et al. | |
| 2015/0269740 A1 | 9/2015 | Mazurenko et al. | |
| 2015/0294397 A1 | 10/2015 | Croy et al. | |
| 2015/0302593 A1 | 10/2015 | Mazurenko et al. | |
| 2015/0310459 A1 | 10/2015 | Bernal et al. | |
| 2015/0327794 A1 | 11/2015 | Rahman et al. | |
| 2015/0332312 A1 | 11/2015 | Cosman | |
| 2015/0363868 A1 | 12/2015 | Kleinhandler et al. | |
| 2015/0379366 A1 | 12/2015 | Nomura et al. | |
| 2016/0095511 A1 | 4/2016 | Taguchi et al. | |
| 2016/0110760 A1 | 4/2016 | Herring et al. | |
| 2016/0125245 A1 | 5/2016 | Saitwal et al. | |
| 2016/0127297 A1 | 5/2016 | Irmak et al. | |
| 2016/0155011 A1 | 6/2016 | Sulc et al. | |
| 2016/0171707 A1 | 6/2016 | Schwartz | |
| 2016/0188962 A1 | 6/2016 | Taguchi | |
| 2016/0189286 A1 | 6/2016 | Zohar et al. | |
| 2016/0203525 A1* | 7/2016 | Hara | G06T 11/60 |
| | | | 705/14.67 |
| 2016/0217157 A1 | 7/2016 | Shih et al. | |
| 2016/0217417 A1 | 7/2016 | Ma et al. | |
| 2016/0259994 A1 | 9/2016 | Ravindran et al. | |
| 2016/0358145 A1 | 12/2016 | Montgomery | |
| 2016/0371726 A1 | 12/2016 | Yamaji et al. | |
| 2016/0381328 A1 | 12/2016 | Zhao | |
| 2017/0024806 A1 | 1/2017 | High et al. | |
| 2017/0032193 A1 | 2/2017 | Yang | |
| 2017/0068861 A1 | 3/2017 | Miller et al. | |
| 2017/0076454 A1 | 3/2017 | Yano et al. | |
| 2017/0116473 A1 | 4/2017 | Sashida et al. | |
| 2017/0124096 A1 | 5/2017 | Hsi et al. | |
| 2017/0148005 A1 | 5/2017 | Murn | |
| 2017/0154212 A1 | 6/2017 | Feris et al. | |
| 2017/0161555 A1 | 6/2017 | Kumar et al. | |
| 2017/0168586 A1 | 6/2017 | Sinha et al. | |
| 2017/0178226 A1 | 6/2017 | Graham et al. | |
| 2017/0193397 A1* | 7/2017 | Kottha | G06N 3/0464 |
| 2017/0206664 A1 | 7/2017 | Shen | |
| 2017/0206669 A1 | 7/2017 | Saleemi et al. | |
| 2017/0249339 A1 | 8/2017 | Lester | |
| 2017/0249549 A1* | 8/2017 | Bai | G06N 3/084 |
| 2017/0255990 A1 | 9/2017 | Ramamurthy et al. | |
| 2017/0278255 A1 | 9/2017 | Shingu et al. | |
| 2017/0308911 A1 | 10/2017 | Barham et al. | |
| 2017/0309136 A1 | 10/2017 | Schoner | |
| 2017/0323376 A1 | 11/2017 | Glaser et al. | |
| 2018/0003315 A1 | 1/2018 | Reed | |
| 2018/0012072 A1 | 1/2018 | Glaser et al. | |
| 2018/0012080 A1 | 1/2018 | Glaser et al. | |
| 2018/0014382 A1 | 1/2018 | Glaser et al. | |
| 2018/0025175 A1 | 1/2018 | Kato | |
| 2018/0032799 A1 | 2/2018 | Marcheselli et al. | |
| 2018/0033015 A1 | 2/2018 | Opalka et al. | |
| 2018/0033151 A1 | 2/2018 | Matsumoto et al. | |
| 2018/0068431 A1 | 3/2018 | Takeda et al. | |
| 2018/0070056 A1 | 3/2018 | DeAngelis et al. | |
| 2018/0088900 A1 | 3/2018 | Glaser et al. | |
| 2018/0150788 A1 | 5/2018 | Vepakomma et al. | |
| 2018/0165728 A1 | 6/2018 | McDonald et al. | |
| 2018/0165733 A1 | 6/2018 | Kundu et al. | |
| 2018/0181995 A1* | 6/2018 | Burry | H04N 7/18 |
| 2018/0189600 A1 | 7/2018 | Astrom et al. | |
| 2018/0217223 A1 | 8/2018 | Kumar et al. | |
| 2018/0225625 A1 | 8/2018 | DiFatta et al. | |
| 2018/0232796 A1 | 8/2018 | Glaser et al. | |
| 2018/0240180 A1 | 8/2018 | Glaser et al. | |
| 2018/0293706 A1 | 10/2018 | Viswanathan et al. | |
| 2018/0295424 A1 | 10/2018 | Taylor et al. | |
| 2018/0322616 A1 | 11/2018 | Guigues | |
| 2018/0329762 A1 | 11/2018 | Li et al. | |
| 2018/0332235 A1 | 11/2018 | Glaser | |
| 2018/0332236 A1 | 11/2018 | Glaser et al. | |
| 2018/0343417 A1 | 11/2018 | Davey | |
| 2018/0365481 A1 | 12/2018 | Tolbert et al. | |
| 2018/0365755 A1 | 12/2018 | Bekbolatov et al. | |
| 2018/0373928 A1 | 12/2018 | Glaser et al. | |
| 2019/0005479 A1 | 1/2019 | Glaser et al. | |
| 2019/0034735 A1 | 1/2019 | Cuban et al. | |
| 2019/0043003 A1* | 2/2019 | Fisher | G06V 10/764 |
| 2019/0057435 A1 | 2/2019 | Chomley et al. | |
| 2019/0147709 A1 | 5/2019 | Schoner | |
| 2019/0156273 A1 | 5/2019 | Fisher et al. | |
| 2019/0156274 A1 | 5/2019 | Fisher et al. | |
| 2019/0156275 A1 | 5/2019 | Fisher et al. | |
| 2019/0156276 A1 | 5/2019 | Fisher et al. | |
| 2019/0156277 A1 | 5/2019 | Fisher et al. | |
| 2019/0156506 A1 | 5/2019 | Fisher et al. | |
| 2019/0188876 A1* | 6/2019 | Song | G06K 7/10425 |
| 2019/0244386 A1 | 8/2019 | Fisher et al. | |
| 2019/0244500 A1 | 8/2019 | Fisher et al. | |
| 2019/0251340 A1* | 8/2019 | Brown | G06N 3/044 |
| 2019/0347611 A1 | 11/2019 | Fisher et al. | |
| 2019/0377957 A1* | 12/2019 | Johnston | G06V 20/49 |
| 2019/0378205 A1 | 12/2019 | Glaser et al. | |
| 2019/0392318 A1 | 12/2019 | Ghafoor et al. | |
| 2020/0074165 A1 | 3/2020 | Ghafoor et al. | |
| 2020/0074393 A1 | 3/2020 | Fisher et al. | |
| 2020/0074394 A1 | 3/2020 | Fisher et al. | |
| 2020/0074432 A1 | 3/2020 | Valdman et al. | |
| 2020/0118400 A1 | 4/2020 | Zalewski et al. | |
| 2020/0134588 A1 | 4/2020 | Nelms et al. | |
| 2020/0151692 A1 | 5/2020 | Gao et al. | |
| 2020/0193507 A1 | 6/2020 | Glaser et al. | |
| 2020/0234463 A1 | 7/2020 | Fisher et al. | |
| 2020/0258241 A1* | 8/2020 | Liu | G06V 20/41 |
| 2020/0293992 A1 | 9/2020 | Bogolea et al. | |
| 2020/0334834 A1 | 10/2020 | Fisher | |
| 2020/0334835 A1 | 10/2020 | Buibas et al. | |
| 2020/0410713 A1* | 12/2020 | Auer | G06T 7/11 |
| 2021/0067744 A1 | 3/2021 | Buibas et al. | |
| 2021/0158430 A1 | 5/2021 | Buibas et al. | |
| 2021/0191519 A1 | 6/2021 | Zhao et al. | |
| 2021/0201253 A1 | 7/2021 | Fisher et al. | |
| 2021/0295081 A1 | 9/2021 | Berry et al. | |
| 2022/0156827 A1 | 5/2022 | Glaser et al. | |

FOREIGN PATENT DOCUMENTS

| | | |
|---|---|---|
| CN | 104778690 B | 6/2017 |
| EP | 1574986 B1 | 7/2008 |
| EP | 2555162 A1 | 2/2013 |
| EP | 3002710 A1 | 4/2016 |
| GB | 2560387 A | 9/2018 |
| GB | 2566762 A | 3/2019 |
| JP | H11175730 A | 7/1999 |
| JP | 2004171240 A | 6/2004 |
| JP | 2004171241 A | 6/2004 |
| JP | 2004348618 A | 12/2004 |
| JP | 2006126926 A | 5/2006 |
| JP | 2008176504 A | 7/2008 |
| JP | 2009055139 A | 3/2009 |
| JP | 2009265922 A | 11/2009 |
| JP | 2010002997 A | 1/2010 |
| JP | 2011209966 A | 10/2011 |
| JP | 2011253344 A | 12/2011 |
| JP | 2012123667 A | 6/2012 |
| JP | 2012147083 A | 8/2012 |
| JP | 2013196199 A | 9/2013 |
| JP | 2014089626 A | 5/2014 |
| JP | 2015011649 A | 1/2015 |
| JP | 2015149559 A | 8/2015 |
| JP | 2016144049 A | 8/2016 |
| JP | 2016532932 A | 10/2016 |
| JP | 2016206782 A | 12/2016 |
| JP | 2017059945 A | 3/2017 |
| JP | 2017062776 A | 3/2017 |
| JP | 2017157216 A | 9/2017 |
| JP | 2018099317 A | 6/2018 |
| KR | 1020180032400 A | 3/2018 |
| KR | 1020190093733 A | 8/2019 |
| KR | 102223570 B1 | 3/2021 |

(56) References Cited

FOREIGN PATENT DOCUMENTS

| TW | 201228380 | A | 7/2012 |
|---|---|---|---|
| TW | 201911119 | A | 3/2019 |
| WO | 0021021 | A1 | 4/2000 |
| WO | 0243352 | A2 | 5/2002 |
| WO | 02059836 | A3 | 5/2003 |
| WO | 2008029159 | A1 | 3/2008 |
| WO | 2013041444 | A1 | 3/2013 |
| WO | 2013103912 | A1 | 7/2013 |
| WO | 2014133779 | A1 | 9/2014 |
| WO | 2014209724 | A1 | 12/2014 |
| WO | 2015017796 | A2 | 2/2015 |
| WO | 2015133699 | A1 | 9/2015 |
| WO | 2016136144 | A1 | 9/2016 |
| WO | 2016166508 | A1 | 10/2016 |
| WO | 2017015390 | A1 | 1/2017 |
| WO | 2017151241 | A2 | 9/2017 |
| WO | 2017196822 | A1 | 11/2017 |
| WO | 2018013438 | A1 | 1/2018 |
| WO | 2018013439 | A1 | 1/2018 |
| WO | 2018148613 | A1 | 8/2018 |
| WO | 2018162929 | A1 | 9/2018 |
| WO | 2018209156 | A1 | 11/2018 |
| WO | 2018237210 | A1 | 12/2018 |
| WO | 2019032304 | A1 | 2/2019 |
| WO | 2019032305 | A2 | 2/2019 |
| WO | 2019032306 | A1 | 2/2019 |
| WO | 2019032307 | A1 | 2/2019 |
| WO | 2020023795 | | 1/2020 |
| WO | 2020023796 | | 1/2020 |
| WO | 2020023798 | | 1/2020 |
| WO | 2020023799 | | 1/2020 |
| WO | 2020023801 | | 1/2020 |
| WO | 2020023926 | | 1/2020 |
| WO | 2020023930 | | 1/2020 |
| WO | 2020047555 | A1 | 3/2020 |
| WO | 2020214775 | A1 | 10/2020 |
| WO | 2020225562 | A1 | 11/2020 |

OTHER PUBLICATIONS

Liu Jingwen et al: "Customer Behavior Recognition in Retail Store from Surveillance Camera", 2015 IEEE International Symposium on Multimedia (ISM), IEEE, Dec. 14, 2015, pp. 154-159.

Mirela Popa et al: "Analysis of shopping behavior based on surveillance system", Systems Man and Cybernetics (SMC), 2010 IEEE International Conference on IEEE, Piscataway, NJ, USA, Oct. 10, 2010 (Oct. 10, 2010), pp. 2512-2519.

Black et al., "Multi view image surveillance and tracking", Motion and Video Computing, 2002. Proceedings. Workshop on Dec. 5-6, 2002, pp. 169-174.

Cai Minjie et al., "An Ego-Vision System for Hand Grasp Analysis", IEEE Transactions on Human-Machine Systems, IEEE, Piscataway, NJ, USA, vol. 47, No. 4, Aug. 1, 2017 (Aug. 1, 2017), pp. 525-535, XP011656554, ISSN: 2168-2291, DOI: 10.1109/THMS.2017. 2681423 [retrieved on Jul. 13, 2017], 12 pages.

Camplani et al., "Background foreground segmentation with RGB-D Kinect data: An efficient combination of classifiers", Journal of Visual Communication and Image Representation, Academic Press, Inc., US, vol. 25, No. 1, Mar. 27, 2013, pp. 122-136,XP028804219, ISSN: 1047-3203, DOI: 10.1016/J.JVCIR.2013.03.009.

Ceballos, Scikit-Leam Decision Trees Explained, https:// towardsdatascience.com/scikit-learn-decision-trees-explained-803f-3812290d, Feb. 22, 2019, 13 pages.

Detone et al, SuperPoint: Self-Supervised Interest Point Detection and Description, Apr. 19, 2018, arXiv:1712.07629v4 [cs.CV] Apr. 19, 2018, 13 pages.

Erdem et al. "Automated camera layout to satisfy task-specific and floor plan-specific coverage requirements," Computer Vision and Image Understanding 103, Aug. 1, 2006, 156-169.

Germann et al., "Space-Time Body Pose Estimation in Uncontrolled Environments," 2011 International Conference on 3D Imaging, Modeling, Processing, Visualization and Transmission, May 2011, pp. 244-251.

Gkioxar et al. "R-CNNs for Pose Estimation and Action Detection," Cornell University, Computer Science, Computer Vision and Pattern Recognition, arXiv.org >cs >arXiv:1406.5212, Jun. 19, 2014, 8 pages.

Grinciunaite et al. "Human Pose Estimation in Space and Time Using 3D CNN," ECCV Workshop on Brave new ideas for motion representations in videos, Oct. 2016, 7 pages.

Harville, "Stereo person tracking with adaptive plan-view templates of height and occupancy statistics," Image and Vision Computing, vol. 22, Issue 2, Feb. 1, 2004, pp. 127-142.

He et al. "Identity mappings in deep residual networks" (published at https://arxiv.org/pdf/1603.05027.pdf), Jul. 25, 2016, 15 pages.

Hofmann et al., Hypergraphs for Joint Multi-view Reconstruction and Multi-object Tracking, 2017, IEEE Conference on Computer Vision and Pattern Recognition, IEEE Computer Society, dated Jun. 23, 2013, pp. 3650-3657, 8 pages.

Huang, et al. "Driver's view and vehicle surround estimation using omnidirectional video stream," IEEE IV2003 Intelligent Vehicles Symposium. Proceedings (Cat. No.03TH8683), Jun. 9-11, 2003, pp. 444-449.

Insafutdinov, Eldar et al., Deeper Cut: A Deeper, Stronger, and Faster Multi-Person Pose Estimation Model, http://pose.mpi-inf. mpg.de, dated Nov. 30, 2016.

Iqbal et al., "PoseTrack: Joint Multi-Person Pose Estimation and Tracking," Proceedings of the IEEE Conference on Computer Vision and Pattern Recognition (CVPR), Jul. 26, 2017, 12 pages.

Jayabalan, et al., "Dynamic Action Recognition: A convolutional neural network model for temporally organized joint location data," Cornell University, Computer Science, Dec. 20, 2016, 11 pages.

Lee et al., Monitoring Activities from Activities from multiple video streams: Establishing a common coordinate frame, IEEE Transactions on Pattern Analysis and Machine Intelligence, IEEE Computer Society, vol. 22, No. 8, dated Aug. 1, 2000, pp. 758-767, 10 pages.

Longuet-Higgins, "A computer algorithm for reconstructing a scene from two projections," Nature 293, Sep. 10, 1981, pp. 133-135.

Redmon et al., "You Only Look Once: Unified, Real-Time Object Detection," University of Washington, Allen Institute for Aly, Facebook AI Research, May 9, 2016, 10 pages.

Redmon et al., YOLO9000: Better, Faster, Stronger, (available at https://arxiv.org/pdf/1612.08242.pdf), Dec. 25, 2016, 9 pages.

Rossi et al., "Tracking and Counting Moving People," IEEE Int'l Conf. on Image Processing, ICIP-94, Nov. 13-16, 1994, 5 pages.

Sheeney de Moraes, Marcel et al., Deep Convolutional Poses for Human Interaction Recognition Monocular Videos, School of Engineering & Physical Sciences, Heriot-Watt University, dated Dec. 13, 2016.

Shigeyuki Odashima et al., "Object Movement Management System via Integration of Stable Image Changes in Multiple Viewpoints", Journal of the Robotics Society of Japan, 2011, vol. 29, Issue 9, pp. 837-848 (Abstract Translation Only).

Symons, "Data Fusion Methods for Netted Sensors with Limited Communication Bandwidth", QinetiQ Ltd and University College London, 2004.

Toshev et al. "DeepPose: Human Pose Estimation via Deep Neural Networks," IEEE Conf. on Computer Vision and Pattern Recognition, Aug. 2014, 8 pages.

Vincze, "Robust tracking of ellipses at frame rate," Pattern Recognition, vol. 34, Issue 2, Feb. 2001, pp. 487-498.

Yusoff et al. "Optimal Camera Placement for 3D Environment," ICSECS 2011: Software Engineering and Computer Systems, Jun. 27-29, 2011, 448-459.

Zhang "A Flexible New Technique for Camera Calibration," IEEE Transactions on Pattern Analysis and Machine Intelligence, vol. 22, No. 11, Nov. 2000, 22 pages.

* cited by examiner

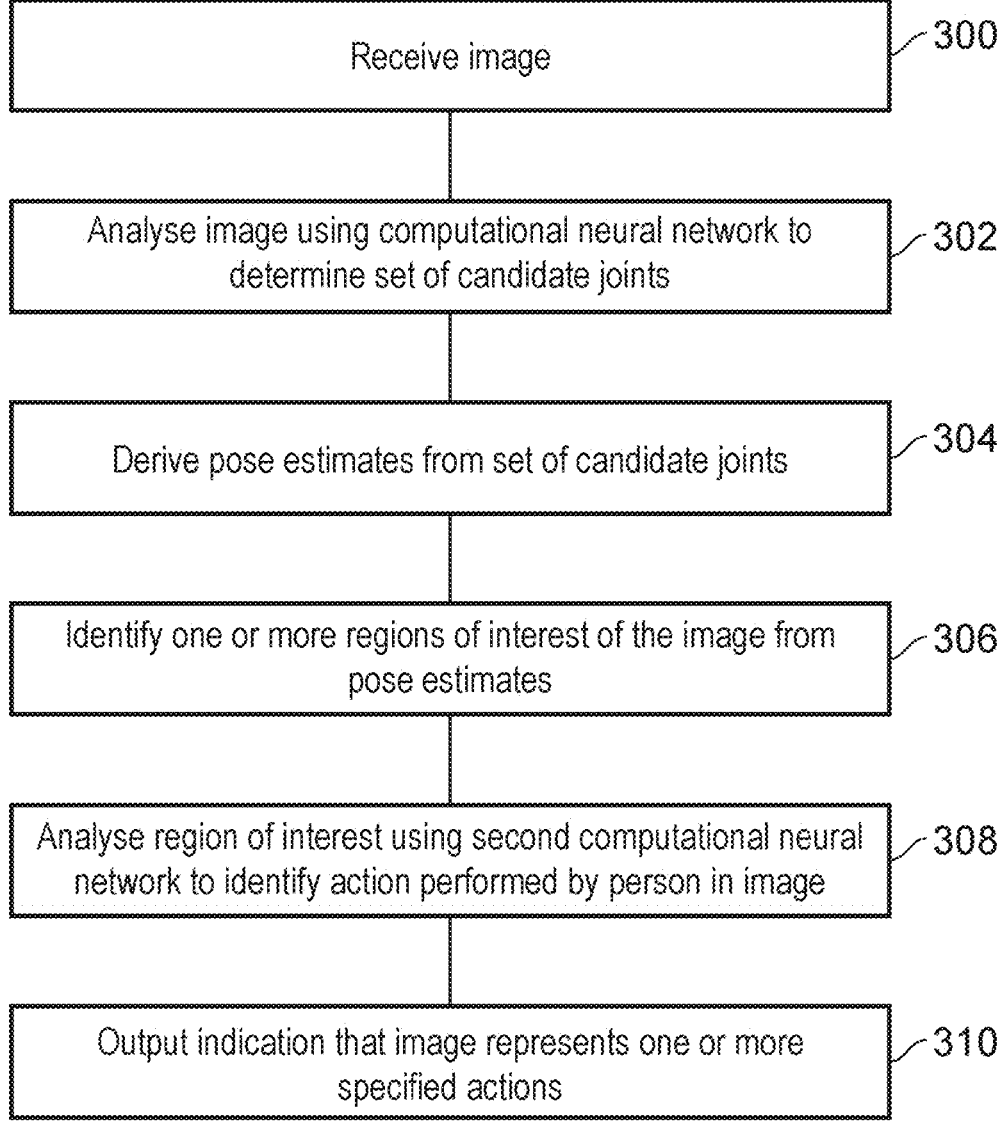

Receive image — 300

Analyse image using computational neural network to determine set of candidate joints — 302

Derive pose estimates from set of candidate joints — 304

Identify one or more regions of interest of the image from pose estimates — 306

Analyse region of interest using second computational neural network to identify action performed by person in image — 308

Output indication that image represents one or more specified actions — 310

FIG. 3

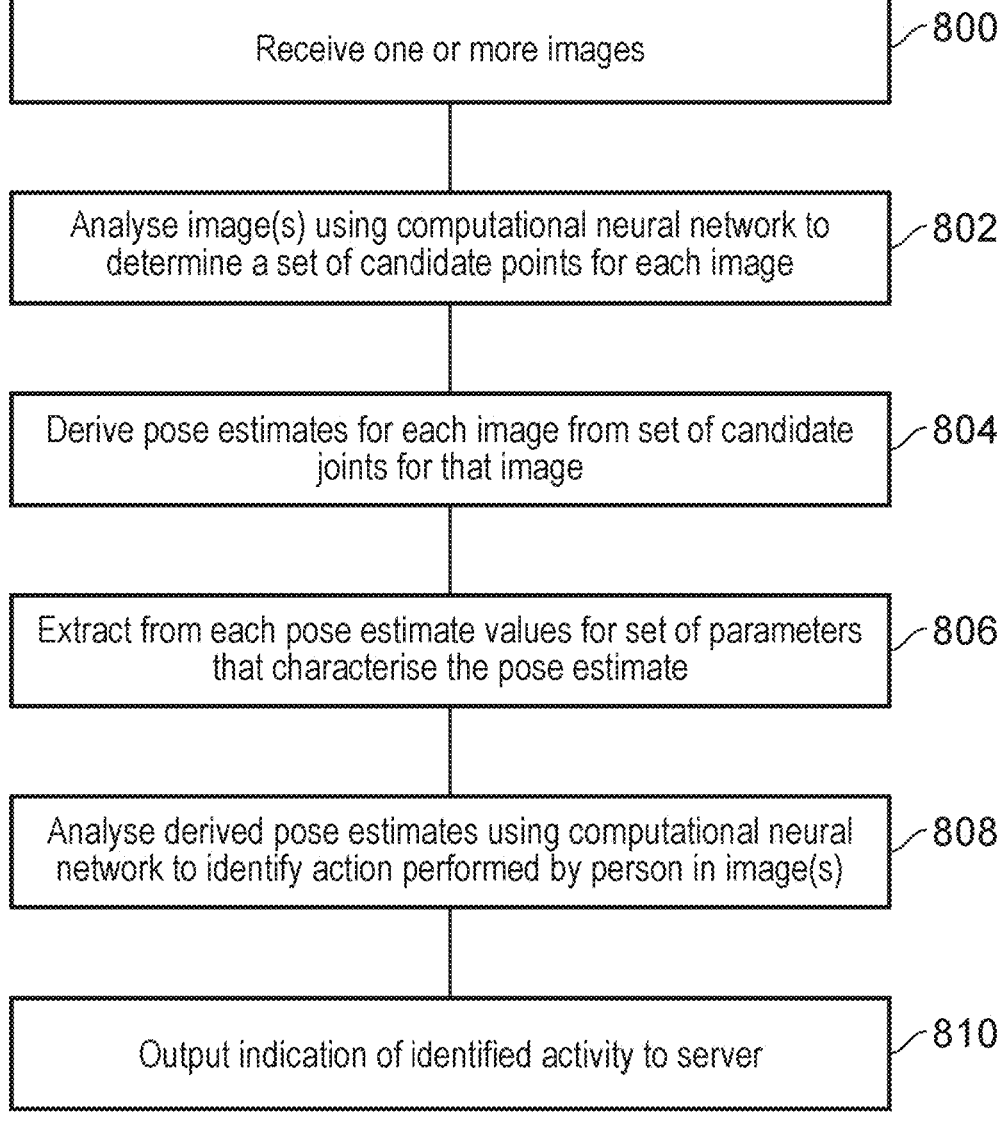

Receive one or more images
800

Analyse image(s) using computational neural network to determine a set of candidate points for each image
802

Derive pose estimates for each image from set of candidate joints for that image
804

Extract from each pose estimate values for set of parameters that characterise the pose estimate
806

Analyse derived pose estimates using computational neural network to identify action performed by person in image(s)
808

Output indication of identified activity to server
810

FIG. 8

IMAGE ANALYSIS USING NEURAL NETWORKS FOR POSE AND ACTION IDENTIFICATION

CLAIM OF PRIORITY

The present application is a continuation of U.S. patent application Ser. No. 17/388,260, filed 29 Jul. 2021, now U.S. Pat. No. 11,790,682, issued 17 Oct. 2023, which is a continuation of U.S. patent application Ser. No. 16/492,781, filed 10 Sep. 2019, which is the U.S. National Stage of a PCT International Patent Application No. PCT/GB2018/050614, filed 9 Mar. 2018, which claims the benefit of and priority to UK Patent Application No. GB1703914.0, filed 10 Mar. 2017, the contents of each of which are hereby incorporated herein by reference.

TECHNICAL FIELD

This invention relates to techniques for analysing images to identify and classify human actions using computational neural networks.

BACKGROUND

Computer vision is a disciplinary field that addresses how computational methods can be employed to gain an understanding of information depicted in images, or videos. To do this, image data (e.g. in the form of single images, image sequences forming a video stream, images captured by a camera etc.) can be processed and analysed to extract information and/or data that can be used to make certain conclusions on what is depicted by those images.

A typical task in computer vision is to identify specific objects in an image and to determine the object's position and/or orientation relative to some coordinate system. Humans are examples of such objects, with the ability to detect humans within images being desirable for a number of applications, for example in the fields of surveillance and video labelling. The detection of humans within images can also be used to perform activity recognition, which again can have a variety of applications.

Both human detection and activity recognition are recognized as complex problems. Both aspects may involve performing human pose estimate, which involves analysing an image to determine a configuration of the human body (in part in in whole) represented in that image. Difficulties in determining the human pose may include: the variability in physiques; the wide variety of poses capable of being adopted by a human as a result of the articulations of the skeleton; the variability of physical appearance; and the occlusion of certain body parts in the image (either self-occlusion from another body part or occlusion from another object in the image). These problems may be exacerbated when more than one person is depicted in the image.

SUMMARY

According to one aspect of the present invention there is provided a method of identifying human actions from an image, comprising: analysing an image depicting one or more people using a first computational neural network to determine a set of candidate joints for the one or more people depicted in the image; deriving pose estimates from the set of joint candidates for the one or more people depicted in the image; and analysing a region of the image using a second computational neural network in dependence on the derived pose estimates to identify an action performed by a person depicted in the image.

The region of the image may define a portion of the image, and only the region of the image may be analysed using the second computational neural network.

The action performed by the person depicted in the image may be identified in response to detecting an object of a specified class in the region of the image.

The region of the image may be identified from the derived pose estimates.

The region of the image may bound a specified subset of joints of a derived pose estimate.

The region of the image may bound one or more derived pose estimates.

The region of the image may bound the terminal end of the arms of a derived pose estimate, and the image region may be analysed using the second computational neural network to identify whether the person depicted in the image is holding an object of a specified class or not.

The image can be captured by a 2-D camera.

The action may be from a class of actions including: scanning an item at a point-of-sale; and selecting an item for purchase.

The first network may be a convolutional neural network.

The second network may be a convolutional neural network.

According to a second aspect of the present disclosure there is provided an apparatus for identifying human actions from an image, comprising: a joint-determination module configured to analyse an image depicting one or more people using a first computational neural network to determine a set of candidate joints for the one or more people depicted in the image; a pose-estimation module configured to derive pose estimates from the set of candidate joints for the one or more people depicted in the image; and an action-identification module configured to analyse a region of the image using a second computational neural network in dependence on the derived pose estimates to identify an action performed by a person depicted in the image.

The region of the image may define a portion of the image, and action-identification module may be configured to analyse only the region of the image using the second computational neural network.

The action-identification module may be configured to identify the action in response to detecting an object of a specified class in the region of the image.

The apparatus further may comprise an image-region module configured to identify the region of the image from the derived pose estimates.

The region of the image may bound a specified subset of joints of a derived pose estimate.

The region of the image may bound one or more derived pose estimates.

The image-region module may be configured to identify a region of the image that bounds terminal ends of a derived pose estimate, and the action-identification module may be configured to analyse the image region using the second computational neural network to identify whether the person depicted in the image is holding an object of a specified class or not.

The apparatus may be configured to receive the image from a 2-D camera.

The action-identification module may be configured to identify the action from a class of actions including: scanning an item at a point-of-sale; and selecting an item for purchase.

The first network may be a convolutional neural network. The second network may be a convolutional neural network.

According to a third aspect of the present invention there is provided a method of identifying human actions from one or more images, comprising: analysing one or more images each depicting one or more people using a first computational neural network to determine for each image a set of candidate joints for the one or more people depicted in the image; deriving pose estimates from the set of candidate joints for each image for the one or more people depicted in the image; and analysing the derived pose estimates for the one or more images using a second computational neural network to identify an action performed by a person depicted in the one or more images.

The method may further comprise extracting from each pose estimate values for a set of one or more parameters characterising the pose estimate, wherein the second computational neural network may be used to identify an action performed by a person depicted in the one or more images in dependence on the parameter values.

The set of one or more parameters may relate to a specified subset of joints of the pose estimate.

The set of one or more parameters may comprise at least one of: joint position for specified joints; joint angles between specified connected joints; joint velocity for specified joints; and the distance between specified pairs of joints.

The one or more images may be a series of multiple images, and the action performed by a person depicted in the series of images may be identified from changes in their pose estimate over the series of images.

The second computational neural network may be used to identify an action performed by the person from the change in the parameter values characterising their pose estimate over the series of images.

Each image of the one or more images may depict a plurality of people, and the method may comprise analysing the derived pose estimates for each of the plurality of people using the second computational neural network to identify an action performed by each person depicted in the one or more images.

The pose estimates may be derived from the set of candidate joints and further from imposed anatomical constraints on the joints.

The first computational neural network may be a convolutional neural network.

The second computational neural network may be a recursive neural network.

The second computational neural network may be a long-short term memory (LSTM) network.

The action may be identified from a class of actions including: scanning an item at a point-of-sale; and selecting an object for purchase.

According to a fourth aspect of the present invention there is provided an apparatus for identifying human actions from one or more images, comprising: a joint-determination module configured to analyse one or more images each depicting one or more people using a first computational neural network to determine for each image a set of candidate joints for the one or more people depicted in the image; a pose-estimation module configured to derive for each image pose estimates from the set of joint candidates for the one or more people depicted in the image; and an action-identification module configured to analyse the derived pose estimates for the one or more images using a second computational neural network and to identify an action performed by a person depicted in the one or more images.

The apparatus may further comprise an extractor module configured to extract from each pose estimate values for a set of one or more parameters characterising the pose estimate, wherein the action-identification module is configured to use the second computational neural network to identify an action performed by a person depicted in the one or more images in dependence on the parameter values.

The set of one or more parameters may relate to a specified subset of joints of the pose estimate.

The set of one or more parameters may comprise at least one of: joint position for specified joints; joint angles between specified connected joints; joint velocity for specified joints; and the distance between specified pairs of joints.

The one or more images may be a series of multiple images, and the action-identification module may be configured to identify the action performed by the person depicted in the series of images from changes in their pose estimate over the series of images.

The action-identification module may be configured to use the second computational neural network to identify an action performed by the person from the change in the parameter values characterising their pose estimate over the series of images.

Each image of the one or more images may depict a plurality of people, and the action-identification module may be configured to analyse the derived pose estimates for each of the plurality of people for the one or more images using the second computational neural network and to identify an action performed by each person depicted in the one or more images.

The pose-estimate module may be configured to derive the pose estimates from the set of candidate joints and further from imposed anatomical constraints on the joints.

The first computational neural network may be a convolutional neural network.

The second computational neural network may be a recursive neural network.

The second computational neural network may be a long-short term memory (LSTM) network.

The action-identification module may be configured to identify the action from a class of actions including: scanning an item at a point-of-sale; and selecting an object for purchase.

BRIEF DESCRIPTION OF DRAWINGS

The present invention will now be described by way of example with reference to the accompanying drawings. In the drawings.

FIG. 3 shows a flowchart of steps of a first method for identifying actions from an image.

FIG. 8 is a flowchart of steps of a second method for identifying a human action from one or more images.

DETAILED DESCRIPTION

Figure 1:
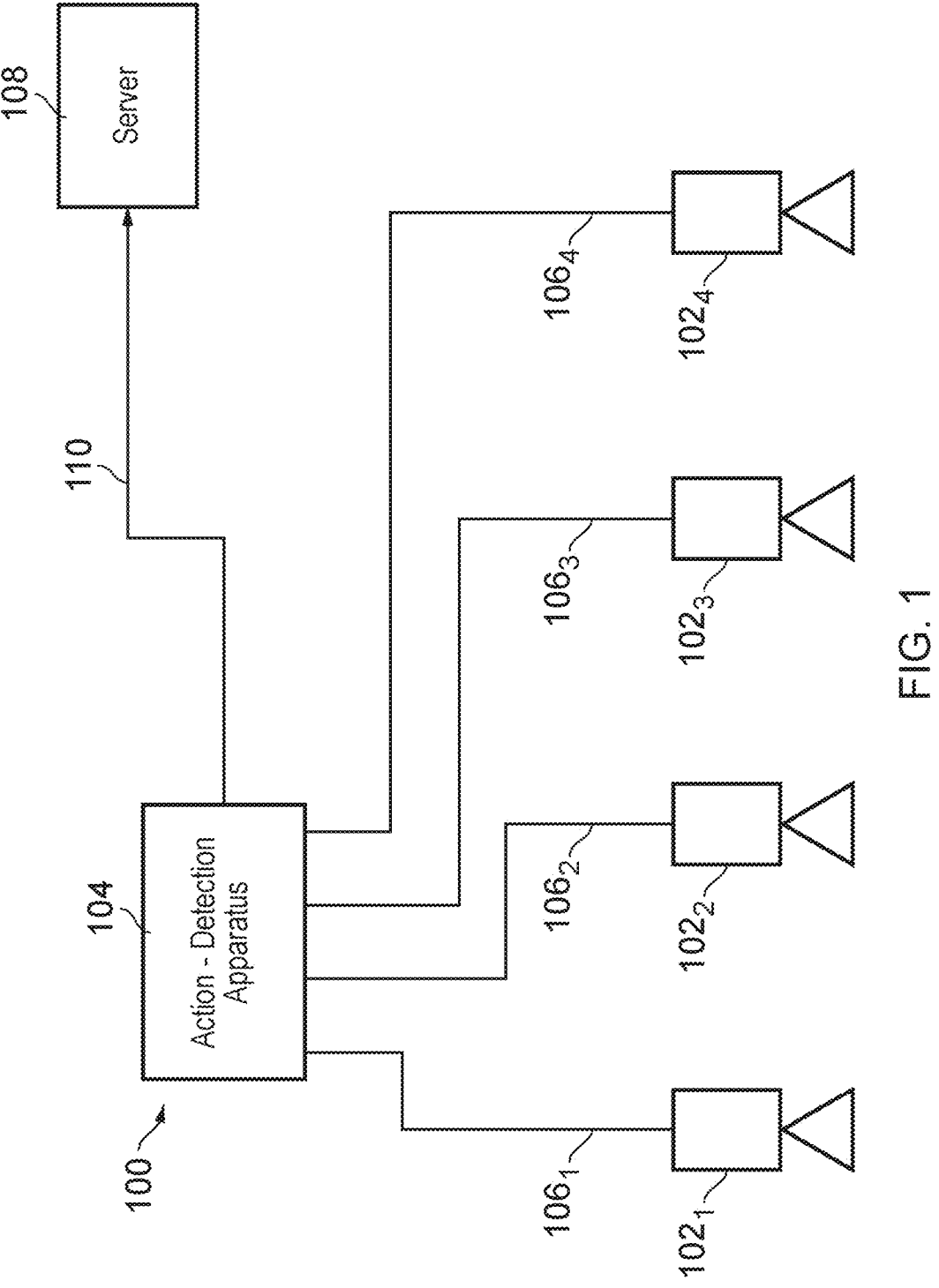
FIG. 1 shows a distributed system for identifying actions from images captured from 2-D cameras.

Embodiments of the present disclosure are directed to systems and methods for identifying actions of humans represented in images using computational neural networks. The images may be digital images. The images may be 2-D images captured from a camera.

To identify a human action for a person represented in an image, one or more images are analysed using a first neural network to determine for each image a set of candidate joints for people represented in the images. The joints may be body joints, such as for example ankle, knee, hip, should, and elbow joints. Each joint corresponds to a coordinate, or location within the image. The first neural network could be a convolutional neural network (CNN). The CNN may be a trained network; that it is to say, the network has previously been trained using training images to identify body joints. The output of the first neural network could be in the form of a vector containing a number of elements corresponding to various coordinates of the image (e.g. in the form of pixel numbers or locations), with each element storing a probability that the corresponding location of the image depicts a joint.

If an image (or sequence of images) contains more than one person, the first neural network may identify a set of candidate joints for each person, or a subset of people. It may identify a set of candidate joints for only a single person.

Once the set of candidate joints have been determined, pose estimates are identified from the candidate joints for each image for the people represented in the images. The pose estimates may be identified using the first neural network. That is, the first neural network may be used to both analyse the one or more input images to determine the set of candidate joints; and also determine the pose estimates from the candidate joints. Alternatively, separate neural networks may be used to identify the candidate joints and the pose estimates. In this case, the output of the neural network that computes the candidate joints may be fed as an input to the neural network that computes the pose estimates.

A pose estimate refers to an estimate of the configuration of a body (in part or in whole). A pose estimate as used herein may therefore be referred to equivalently as a body pose. A pose estimate may be represented in a variety of ways. For example, a pose estimate may parameterize the body as a series of kinematic links. This may be referred to as the kinematic tree representation of the body configuration. Another way to represent the pose estimate is as a set of body parts, each with its own position and orientation in space. The pose estimates may be generated from the set of candidate joints using knowledge of typical human anatomy. A set of statistical or physical constraints may be used to enforce a pose estimate with skeletal consistency.

Once pose estimates have been calculated for each of the one or more images, a further computational neural network is employed in dependence on the pose estimates to identify a human action performed by a person represented in the one or more images. Two classes of examples will be described herein for identifying the human actions from the pose estimations.

One class of examples involves using a non-recursive neural network (e.g. a convolutional neural network (CNN)) to analyse a region of the image identified from the pose estimate in order to identify an action performed by the person depicted in the image. For example, the pose estimate for a person in the image can be used to identify a body part of interest for that person, e.g. a hand, foot etc. The image—and in particular, a sub-part of the image in which the body part is located—can then be analysed by a CNN network to determine whether the image contains a specific object in proximity to the body part of interest (e.g. within the sub-part of the image) that's indicative of a categorised human action. As an example, the body part of interest could be the person's hand, and the specific object could be a store item. In this case, detection of the specific object in the image within a specified proximity of the user's hand can be used to recognize that the person has performed the activity of selecting a store item, or the activity of scanning a store item at a check-out. As another example, the body part of interest could be the person's foot, and the specific object could be a ball. In this case, the detection of the ball within a specified proximity of the person's foot could be used to recognize that the person has performed the activity of kicking the ball.

The second class of examples involves using a neural network to analyse the identified pose estimates directly and identifying an action performed by a person depicted in the one or more images in dependence on their pose estimates in the one or more images. The pose estimates may be analysed for a single image, or over a sequence of multiple images. For example, the neural network could be a recursive neural network (e.g. a long-short term memory (LSTM) network) to analyse the identified pose estimates over a sequence of images. An action performed by a person depicted in those images can then be identified from changes in their pose estimate over the series of images. That is, the recurrent neural network could operate to analyse the identified pose estimates in each of a plurality of (sequential) images to identify categorised actions from the change in the pose estimates over the images. As an example, changes in the pose estimate of a person over a sequence of images can be used to identify that that person has performed the task of scanning an item at a checkout; kicked a football; thrown a baseball etc. Alternatively, the neural network could be a non-recursive neural network (e.g. a convolutional neural network) that analyses the pose estimates for a single image and identifies an action from parameters associated with the pose estimates for that image (e.g. one or more joint angles of a pose estimate, relative joint positions of one or more joints, etc.).

Further examples of how categorised human actions can be identified from one or more digital images will now be described with reference to the figures. The following examples are described in the context of detecting user actions for the purposes of tracking user purchases and/or to prevent theft from a store. It will be appreciated from the following that this context has been chosen merely for illustration and that the following techniques for identifying human actions can be applied in a variety of contexts and environments.

FIG. 1 shows an example of a distributed computing system 100. The system 100 comprises a plurality of cameras 1021,2,3,4. The cameras may be 2-D cameras—that is, they may capture 2-D images. In the context of this example, the cameras are located within a store. The cameras are connected to an action detection apparatus 104 by respective communication links 1061,2,3,4. The communication links could be wired or wireless links. The links communicate images captured by the cameras to the apparatus 104. The apparatus 104 could be remote from the cameras 102. For example, the apparatus could be implemented as a server (e.g. a cloud-based server) separated from the cameras by a wireless network (not shown).

The apparatus 104 receives 2-D digital images captured by the cameras and processes those images to identify actions undertaken, or performed by, one or more people depicted in the images. This will be described in more detail below. The apparatus 104 is coupled by communication link 110 to a security server 108.

The security server 108 is configured to receive indications of the identified human actions from the apparatus 104. The server could use these indications to corroborate data collected at a point-of-sale (POS) in the store. For instance, each camera 102 may be located so as to have a view of one or more POSs in the store, and the apparatus 104 may be configured to analyse images captured from the cameras 102 to determine whether a cashier in the image captured by a camera is holding an object. An indication that a cashier captured in an image by a particular camera is holding an object can be communicated to the server 108. The apparatus 104 may communicate along with that indication an indication of the camera (e.g. in the form of a camera ID) used to capture the image of that cashier. The server 108 may store an association between camera IDs and POS IDs (where the ID of the POS and the ID of the camera used to capture images of that POS are associated together). The server 108 may then use the received camera ID to determine whether the object identified from the image captured by that camera appears in the POS data for the associated POS. In this way actions identified from scanning the images captured by the cameras can be used to identify theft from the store.

As another example, the cameras 102 may be positioned within the store so as to be have a view of displayed items for sale. The apparatus may then be configured to analyse the images captured from the cameras to identify when a person selects an item for purchase. An indication that a person in a captured image has selected an item for purchase (and an indication of that item) may then be communicated to the server 108. The server 108 may then use this information to generate an itemised bill for the person. That itemised bill may be communicated to a POS in the store, where it may be used to corroborate the POS data generated for that person. Alternatively, the itemised bill may be communicated to the person at a later time (e.g. after the person has left the store) for payment.

Figure 2:
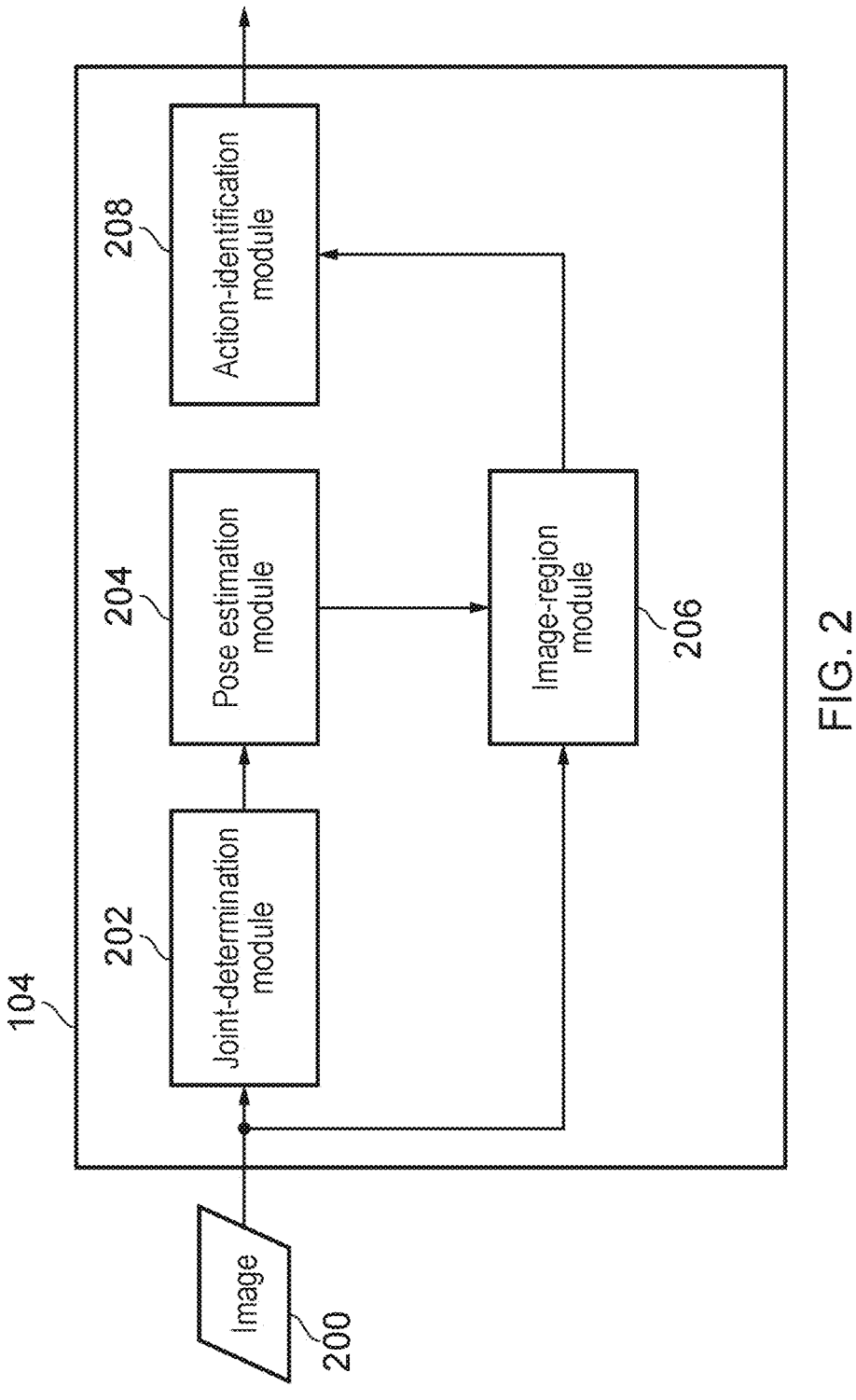
FIG. 2 shows an example of an apparatus for identifying actions from images forming part of the distributed system of FIG. 1.

An example of the apparatus 104 is shown in more detail in FIG. 2. The apparatus 104 comprises a joint-determination module 202 and an image-region module 206 configured to receive an image 200 captured from a camera (e.g. camera 1021). The joint determination module 202 is coupled to a pose estimation module 204, which is also coupled to the image-region module 206. The image-region module is further coupled to an action-identification module 208.

The operation of the apparatus 104 to identify a human action from a received digital image will now be described with reference to the flowchart in FIG. 3 and the diagram in FIG. 4.

At step 300, the apparatus 104 receives digital image 200 of a scene comprising two people. An example of the input image 200 is shown in FIG. 4, with the depicted people being shown at 404 and 406.

At step 302, the joint-determination module 202 analyses the image 200 using a computational neural network to determine a set of candidate joints for the people depicted in the image. The neural network is shown schematically in FIG. 4 at 420.

The joints may be provided as a set of two-dimensional joint locations on the image; i.e. each candidate joint may be provided as an image coordinate. As used herein, a 'joint' as it relates to a candidate joint refers to a point of interest on the body. Though a joint may correspond to a point of the body that is anatomically considered a joint (e.g. the knee, elbow, ankle etc.), it need not necessarily do so. For example, a candidate joint could include: foot, ankle, knee, hip, torso, shoulder, elbow, wrist, neck or head. The set of candidate joints is denoted D.

Figure 5:
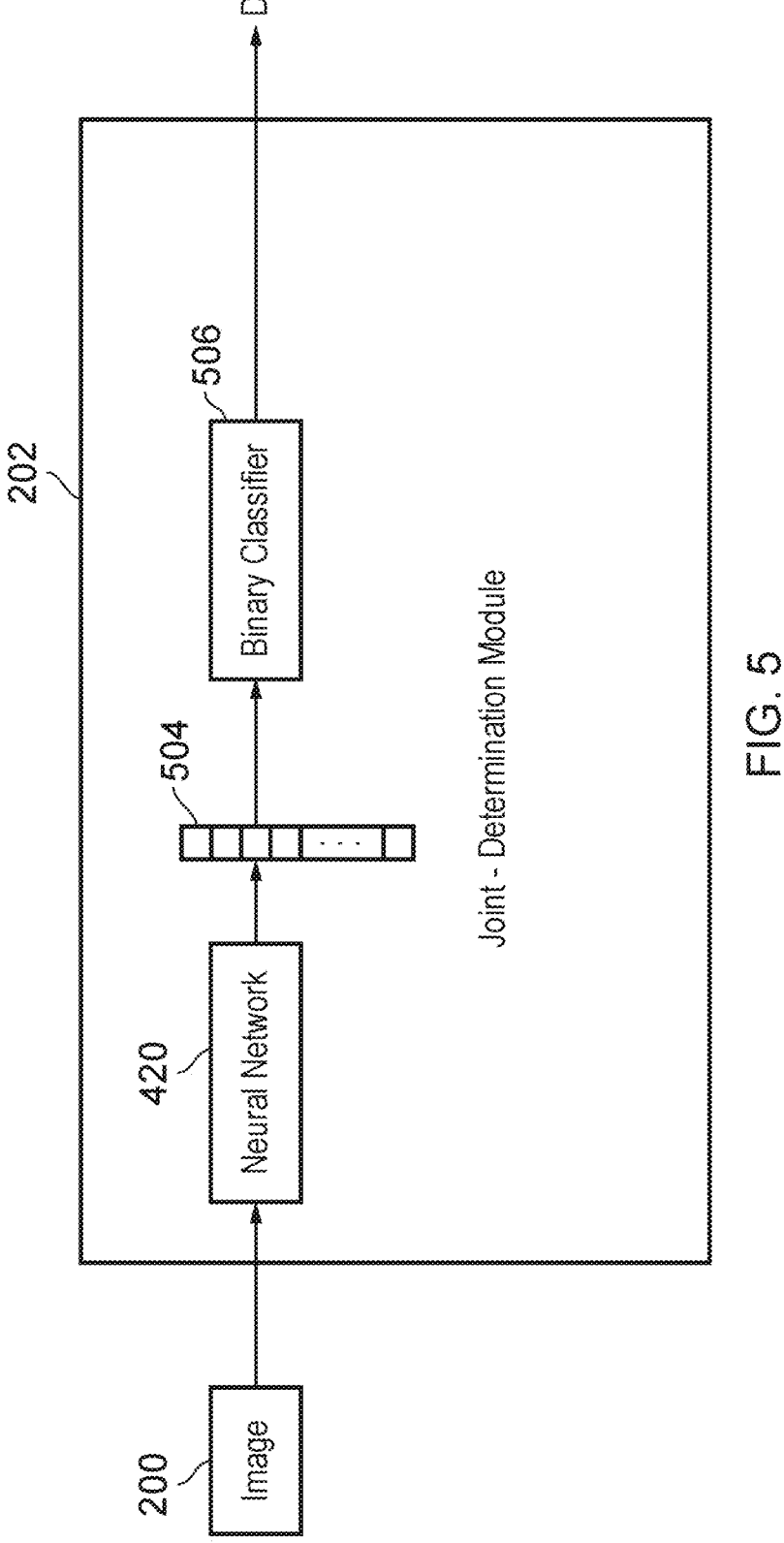
FIG. 5 shows an example of a joint-detector module forming part of the apparatus for detecting human actions from images.

An example of the joint determination module 202 is shown in more detail in FIG. 5.

The computational neural network 420 is a computational model that calculates and/or approximates one or more functions based on one or more inputs. The basic unit of computation in a neural network is a neuron. A neuron may also be referred to as a node. A neuron receives input(s) from other neurons in the network, or from an external source. Each input may be associated with a weight, and (depending on the type of neuron) the neuron then calculates an output by applying a function to the weighted sum of its inputs. The function applied by the neuron may be non-linear. A neural network may contain multiple neurons arranged in layers. The layers are arranged so that neurons in a given layer do not communicate with each other. The neural network may comprise three distinct types of layers: an input layer, a hidden layer, and an output layer. The input layer is formed of neurons that provide inputs to the network. The input nodes may themselves not perform any computation. The hidden layer is formed of neurons that have no direct connection to the outside system. The neurons of the hidden layer perform computations to provide an output from one or more inputs. A neural network may be formed of one or more hidden layers. The output layer is formed of neurons that perform computations to provide outputs from the network.

The neural network 420 may be a convolutional neural network (CNN). A convolutional neural network is a feed-forward network in which each layer of the network is connected to every other layer in a feed-forward fashion (i.e. data propagates through the network in a single direction from the input layer to the output layer). The hidden layers of a convolutional neural network perform the operations of convolution; non-linearity; pooling, or sub-sampling; and regression and/or classification. Classification involves categorising input data into one or more classification labels. Regression may involve generating a value that may be continuous within a given range (e.g. 0 and 1). A CNN that performs classification may also comprise a regression layer, where the values output from the regression layer are classified into binary values to enable the input data to be categorised into a class.

The neural network 420 of the joint determination module may receive as its input the image 200. In this example, the output of the neural network 420 is an N-dimensional vector 504, where each element of the output vector denotes the probability of a joint being present at a particular location in the image Each element of the N-dimensional vector output from the neural network may correspond to a sub-portion of the input image. For example, each element of the output vector may correspond to an nxm block of pixels of the input image. The values of n and m may both be '1', i.e. the output vector may specify a per-pixel probability that a joint occurs in each pixel of the image 200. That is, each sub-portion of the image may be a single pixel. The sub-portions corresponding to each vector element may span the entire image. Each element of the output vector could correspond to a discrete and separate sub-portion of the image, or the elements of the output vector may correspond to overlapping sub-portions of the image. The value of each element may then denote the probability that the corresponding sub-portion of the image contains a joint.

Alternatively, the output of the network 420 could be in the form of an N×M matrix, where each element of the matrix corresponds to a sub-portion of the input image.

The joint-determination module may apply a binary classifier 506 to the output vector 504 or matrix of the neural network 420 to generate the set of candidate joints D. The binary classifier may operate to classify a sub-portion of the image as representing, or containing, a joint if the probability represented by the value of the corresponding element of the output vector is above a specified threshold. The set of candidate joints may then be identified as the locations of the image 200 determined to contain a joint. The location on the image of each candidate joint can be determined by the joint-determination module 202 from the mapping between each element of the output vector from the neural network and the spatial location of the corresponding sub-portion of the image. This mapping may be stored in memory, either in the joint-determination module 202 or within some other part of the apparatus 104. Of course, if the output of the neural network 420 already represents binary classifications for each sub-portion of the image, a separate binary classifier 506 may not be required.

Figure 4:
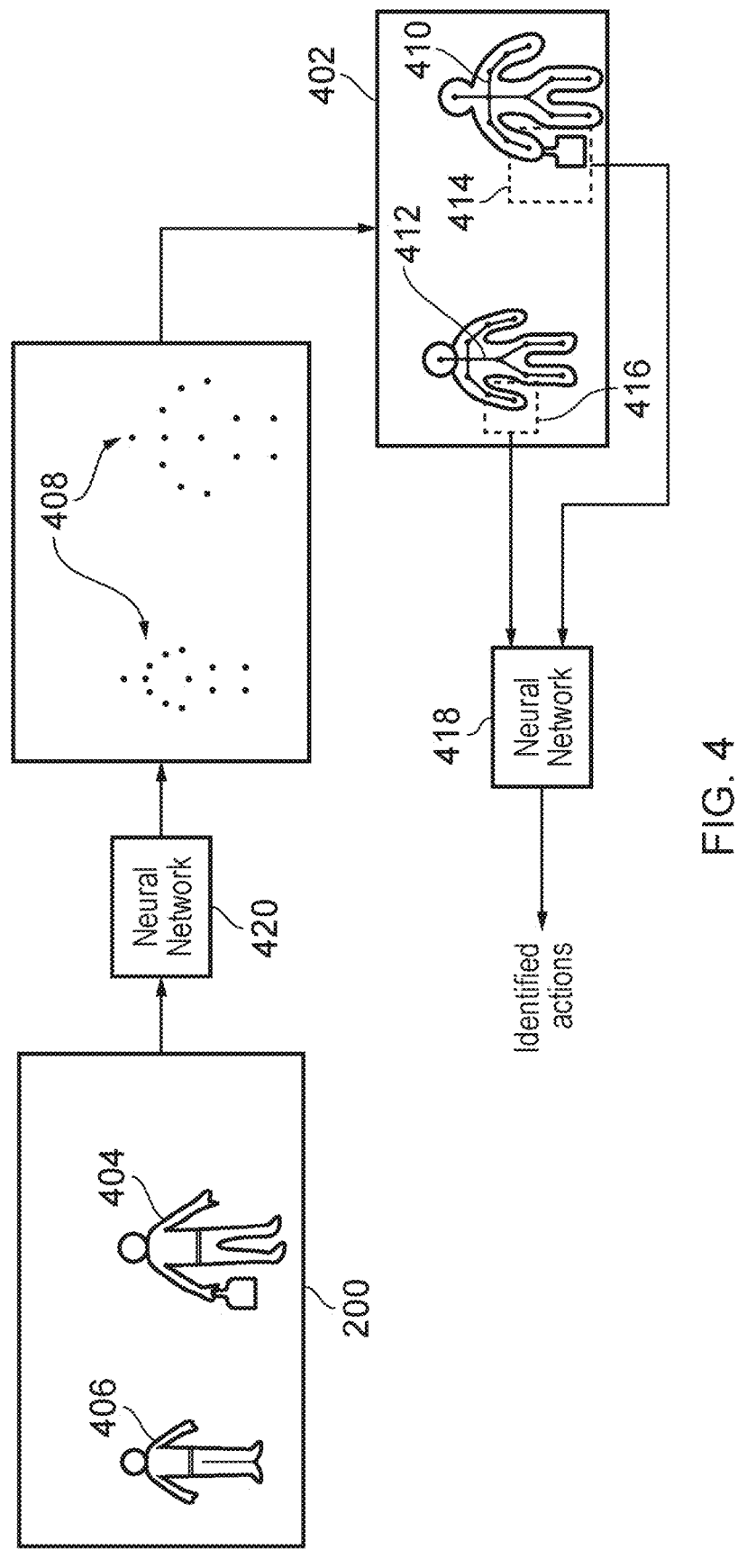
FIG. 4 shows a schematic illustration of how an image may be processed in accordance with the first method to detect an action performed by a person depicted in the image.

The set of candidate joints D determined by the joint determination module 202 are illustrated in FIG. 4 at 408.

The joint determination module 202 then outputs the set of candidate joints to the pose-estimation module 204.

At step 304, the pose-estimation module 204 derives pose estimates from the set of candidate joints D for the people depicted in the image 200.

It is noted that the set of candidate joints D, whilst indicating the spatial locations of the candidate joints within the image 200, may not contain any indication of the types of each joint. In other words, the set of candidate joints may contain little or no information on the class (i.e. hip, knee, ankle, head etc.) to which each candidate joint belongs, nor of the person in the image to which each joint belongs. The pose 14 estimation module operates to derive the pose estimates of the people in the image 200 from the set of candidate joints. It may do this by first associating each candidate joint with a body part. That is, the pose-estimation module 204 operates to label each joint d in the set of candidate joints D with a body-part class c of the set of classes C. Examples of body-part classes c include, for example, foot, ankle, knee, hip, torso, shoulder, elbow, head etc. The pose-estimation module may then partition the labelled body parts that belong to each person 404 and 406 in the image.

Figure 6:
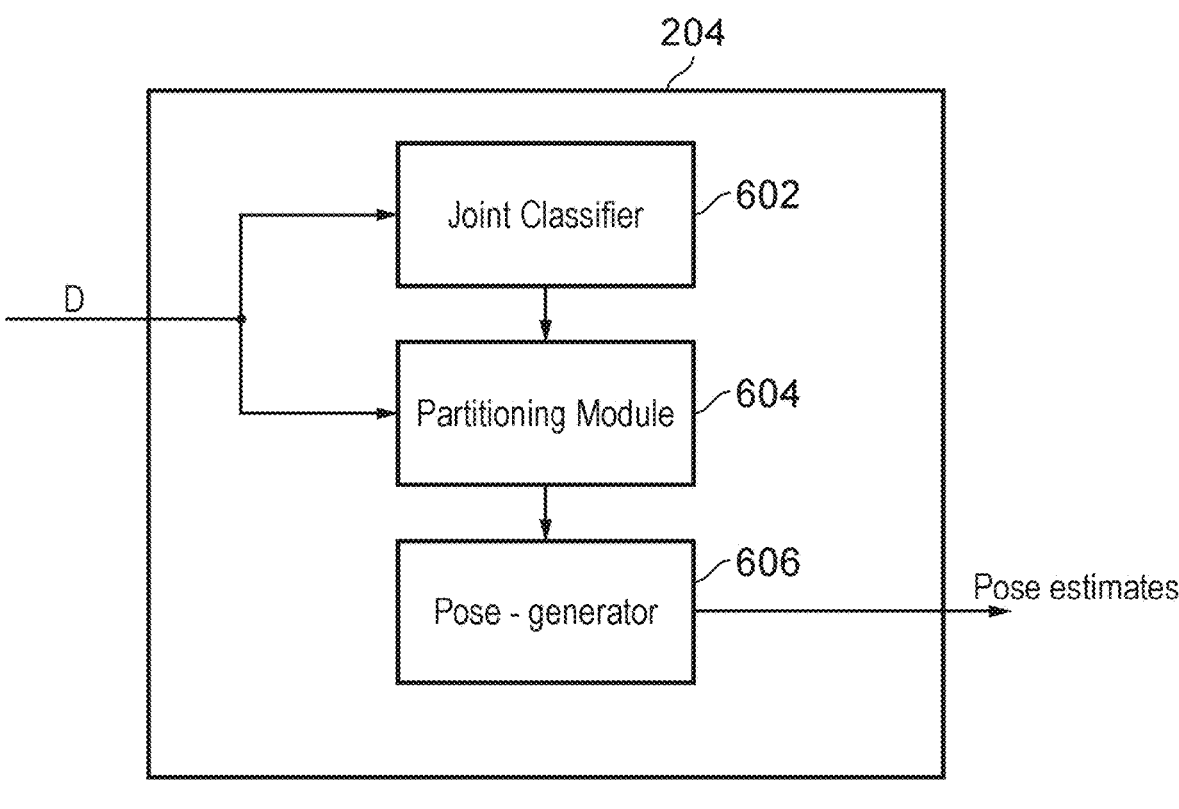
FIG. 6 shows an example of a pose-estimation module forming part of the apparatus for detecting human actions from images.

An example of the pose estimation module 204 is shown in FIG. 6. The pose-estimation module comprises a joint-classifier 602, a partitioning module 604 and a pose-generator 606.

The joint classifier 602 calculates a set of probabilities pdc that a joint candidate d from the set D is a body part c from the set of classes C. The joint-classifier may calculate a probability pdc for each combination of d and c. The joint classifier may operate to calculate the set of probabilities based on specified anatomical constraints. These anatomical constraints may be specified by a body model, or multiple body models.

The joint classifier also operates to calculate a set of conditional probabilities that a set of candidate joints belong to the same person given that the candidate joints belong to particular body-part classes. Mathematically, this may be expressed by saying that the partitioning module operates to calculate a set of conditional probabilities pdd' cc', where pdd'cc' specifies the probability that candidate joints d and d' belong to the same person, given that d and d' belong to body-part classes c and c' respectively. If probabilities pdd'cc' are calculated for each value d and c in the sets D and C respectively, then each body part can be connected to all other body parts in the set D.

The set of probabilities pdc and pcc'dd' are input into the partitioning module 604. The partitioning module 604 operates to both: i) partition the set of candidate joints D into clusters corresponding to each person in the image (that is, the partitioning module forms a respective cluster of candidate joints for each person depicted in the image); and ii) associate each candidate joint d with a body part class c. The partitioning module does this in dependence on the set of probabilities pdc and pdd'cc'. The cluster of joints d formed for each person in the image may be referred to as a person cluster.

From the set of person clusters and the class c of each joint d within a given cluster, the pose-estimation module can derive a pose estimate for each person depicted in the image. The pose-estimation module may derive the pose estimates in dependence on a body model that defines relationships (i.e. connections) between joints of each class c. For instance, the body model may specify that the left knee is connected to the left ankle and hip, the left shoulder is connected to the left elbow, etc. Thus, from the body model and knowledge of the class c of each joint d within a given person cluster, the pose-estimation module can derive a pose estimate for each person in the image. This may be performed by the pose-generator 606.

The pose-estimates for the people 404 and 406 are illustrated at 410 and 412 respectively.

The apparatus 104 therefore derives the pose estimates by first generating a set of candidate joints from the input image. This differs to some approaches to pose estimation which first detect people within the image (e.g. using a neural network) and then estimate the body pose from the identified people. However, these approaches suffer from problems when trying to identify the poses for people with overlapping body parts. By deriving the pose estimations from a set of candidate joints, these problems may be avoided due to the larger amounts of data used to derive the pose estimates, meaning overlapping people in an image are less likely to be mixed up.

The derived pose estimates are then output from the pose estimation module 204 to the image-region module 206.

In the above examples, the steps of identifying the set of candidate joints D and deriving the probabilities that each of those joints belongs to a body part of a particular class c are presented as separate steps. In an alternative arrangement, the neural network 420 may operate to output a two-dimensional array (i.e. a matrix) of values, where each element of the array corresponds to: i) a sub-region of the image; and ii) a joint belonging to a particular body part class c of the set of classes C. That is, the value of an element in the array indicates the probability, or likelihood, that the corresponding sub-region of the image contains a joint belonging to body part class c. Each row (or each column)

of the array may correspond to a respective body part class c of the set C. Each element of the array within a given row (or column) indicates the probability that the corresponding sub-region of the image contains a joint belonging to the body part class for that row (or column). That is, the values of the array A may be denoted aic, where aic indicates the likelihood that image sub-region i contains a joint belonging to body part class c (in the example that each column of the array corresponds to a respective body part class). Alternatively, the values of the array may be denoted aci in the example that each row of the array corresponds to a respective body part class.

In this case, the array A may be output by the joint determination module 202 to the pose estimation module 204. In this case, the pose estimation module may not include a joint classifier module 602. However, it may still include a partitioning module 604 and pose generator 606 that operate to generate the pose estimates from the array A.

At step 306, the image-region module 206 identifies one or more regions of interest of the image 200 from the derived pose estimates 410 and 412.

Each region of interest defines a portion of the image 200. The portion may be a sub-region of the image. The regions of interest may be in the form of bounding boxes that define a portion of the image. The regions of interest need not be rectangular, but could be other shapes such as circular, or rhomboidal. As will be explained in more detail below, the regions of interest are analysed by the action-identification module 208 to identify an action performed by one or more of the people 404 and 406.

The regions of interest may therefore be generated depending on the type of categorised actions that can be identified by the apparatus 104 from the image. In the present example, the apparatus 104 operates to detect whether a person in a captured image 200 is selecting an object for purchase, or scanning an object at a checkout. Thus, the regions of interest may be defined so as to bound the distal ends of the arms of a derived pose estimate (i.e., distal joints of the pose estimate), for example the hands and elbows of each derived pose estimate. Regions of interest for the frame 200 that bound the hands and elbows for each pose estimate are shown in FIG. 4 at 414 and 416. More generally, the image region module may define the regions of interest so that each region of interest bounds a specified subset of joints of a derived pose estimate.

If the image contains more than one person and thus more than one pose estimate is derived by module 204 (as in the present example), the image-region module 206 may define regions of interest that bound a specified subset of joints of respective pose estimates (that is, a region of interest may be defined for each pose estimate that bounds the specified subset of joints of that pose estimate). More than one region of interest may be defined for each pose estimate. For instance, a first region of interest may be defined for each pose estimate that bounds a first subset of joints, and a second region of interest may be defined for each pose estimate that bounds a second subset of joints.

In some implementations, a region of interest may bound all the joints of a derived pose estimate. It is possible that two distinct regions of interest defined by the image-region module 206 overlap. For example, if the people 404 and 406 are in close proximity to each other and/or have overlapping body parts, it is possible that regions of interest bounding specified joints may overlap.

The size of the region of interest may be implementation specific. A smaller region of interest (e.g. one that more closely bounds a specified set of joints/body parts) may be less computationally expensive to analyse at the action-identification module 208 but may suffer from poorer quality action categorisations. This may be because, for example, the presence of an object that may be used to infer the performance of a particular activity may be present in the image but not wholly located in the region of interest. This may lead the identification module 208 to incorrectly conclude, from analysing the region of interest, that the object is not present in the image and thus a specified human action associated with that image (e.g. scanning an item at a check-out) is not being performed, when it is.

The location of each region of interest in the image 200 may be dependent on the joints of the derived pose estimate. For example, if the image region is to bound a particular joint of the pose estimate, the region may be centred on that joint.

The image-region module 206 outputs the identified regions of interest 414 and 416 to the action-identification module 208.

At step 308, the action-identification module 208 analyses the regions of interest 414 and 416 using a second computational neural network to identify an action performed by a person depicted in the image 200. This is illustrated in FIG. 4 by the neural network 418.

The module 208 may be configured to analyse only the regions of interest 414 and 416 of image 200 as determined by the image-region module 206 (i.e., the module 208 may not analyse the remaining parts of the image 200). This advantageously reduces the computational cost of analysing the image using the second neural network in order to identify categorised actions.

The action-identification module 208 may be configured to identify an action belonging to a predetermined class of actions. The predetermined class of actions may be specified during a training stage of the neural network. In the present example, that class of actions could include a person selecting an item for purchase, and a person scanning an item at a point-of-sale.

The computational neural network 418 employed by the module 208 to analyse the regions of interest may be a convolutional neural network, or some other type of network. The network may receive as its input the regions of interest 414, 416 of image 200 identified by the module 206. It may optionally receive information on the pose estimates identified at step 304. The output of the neural network 418 may be an M-dimensional vector, where each element of the vector corresponds to a categorised human action from a class of M actions. The value of each element of the vector may denote a probability that the corresponding human-action is being performed by a person in the image 200. As such, the output vector may be referred to as a human-action vector. The values of each element may be continuous values within a specified range (e.g. 0 to 1). That is, the values output by the neural network 418 may be regression values. Alternatively, the values may be binary values (e.g. generated from the regression values by means of a binary classification).

The neural network may output a human-action vector for each region of interest received from the image-region module 206. Alternatively, each region of interest identified from a given image (e.g. image 200) may be analysed by the action-identification module 208 and a single output generated by the neural network 418. That single output could be in the form of a human-action vector. Alternatively, the output of the neural network 418 may in the form of an N×M (or M×N) matrix, where each column or row of the matrix corresponds to a respective region of interest identified from a given image such as image 200. Each element of a given row (or column) may then correspond to a categorised action from the set of M actions.

The neural network 418 may be used to analyse the regions of interest to determine whether an object indicative of a categorised human action is present in the region of interest. If an object belonging to a certain class is detected in the region of interest, it may be determined that a specified human action is being performed. If no object is detected within the region of interest, it may be determined that a specified human action is not being performed. Thus, the neural network 418 of the action-identification module 208 may perform object detection in each region of interest for objects belonging to specified classes. The presence of an object belonging to one of the specified classes may be used to infer that a specified human action is being performed. In this case the neural network 418 may not need to receive as an input information on the derived pose estimates.

In the present example, in which the categorised human actions include a person selecting an item for purchase, and a person scanning an item at a point-of-sale, classes of objects may include, for example: food items; clothing; homeware; electrical items etc. It is noted that for certain implementations the resolution of the object classes need not be overly fine. As a specific example, it may not be necessary for the action-identification module 208 to recognise the particular brand of toothpaste within a region of interest—it may be sufficient to conclude that a person in the image has performed the step of scanning an item or selected an item for purchase if (brand-agnostic) toothpaste can be identified in the region of interest.

Rather than identifying human actions in response to detecting an object of a specified class in a region of interest, the action-identification module 208 may instead use the second neural network 418 to analyse the regions of interest to scan for body parts and identify a human action from recognised relationships between those body parts. Those relationships could be spatial, or kinematic relationships. For example, the module 208 may scan a region of interest for a forearm and upper arm. The module 208 could then identify a scanning action at a point of sale in response to identifying that the angle between the forearm and upper arm is within a specified range, since the human arm typically adopts a particular configuration at the elbow and shoulder joints when performing a scan. More generally, the action-identification module 208 may analyse the regions of interest to scan for body parts in a configuration indicative of the performance of a human action. The configuration may be specified by presence of multiple body parts in proximity to each other (e.g. hands), the angles formed by two or more body parts relative to each other (e.g. the upper and lower arms; upper and lower legs etc.); the orientation and/or location of one body part relative to another etc.

If the neural network 418 analyses the regions of interest to scan for body parts, the network may receive as an additional input information on the pose estimates derived at step 304. The pose estimates may be used to guide, or focus, the detection of body parts within the regions of interest. For example, the neural network may analyse the parts of the region of interest indicated by the pose estimates to contain a body part.

The outputs of the neural network 418 for each region of interest of image 200 can then optionally be used to classify the image 200 as representing a specified human action or not. For example, if the probability associated with a particular action in the class (e.g., as specified by an element of the human-action vector) is above a predetermined threshold, the region of interest from which the vector was generated (and the corresponding image 200) are determined to represent a specified human action. This process may be performed by a classifier module in the action-identification module 208.

At step 310, the apparatus 104 outputs an indication that the image 200 represents one or more specified human actions of a class of actions (i.e., an indication that a specified action is performed by one or more people depicted in the image 200). As explained above, those indications may be binary values (e.g. in the form of classification labels), or regression values.

The output generated from the apparatus 104 may contain: an indication of the image (e.g. an image ID such as an image number); an indication a class of human action is performed by a person depicted in the image; and potentially an indication of the class of human action being performed.

The output may be communicated to the security server 108. The security server 108 may use the output in a manner described above.

Since an image may depict multiple people (and thus the image-region module 206 may identify multiple regions of interest), it is possible that a single image may be determined to represent multiple specified human actions. For example, it may be determined that a first action is performed by a first person depicted in the image, and a second action is performed by a second person depicted in the image. The examples described above, in which the pose estimates are derived from a set of candidate joints and the regions of interest are determined from the derived pose estimates, enables multiple human actions to be identified from images depicting multiple people with relative ease.

The above examples describe how the apparatus 104 can identify a human action from analysing a region of interest of an image determined from the pose estimates of the one or more people depicted in the image. Examples of how the apparatus 104 can be used to identify human actions performed by people depicted in one or more digital images from an analysis of the pose estimates (i.e. without determining regions of interest in the image) will now be described with reference to FIGS. 7 to 9.

Figure 7:
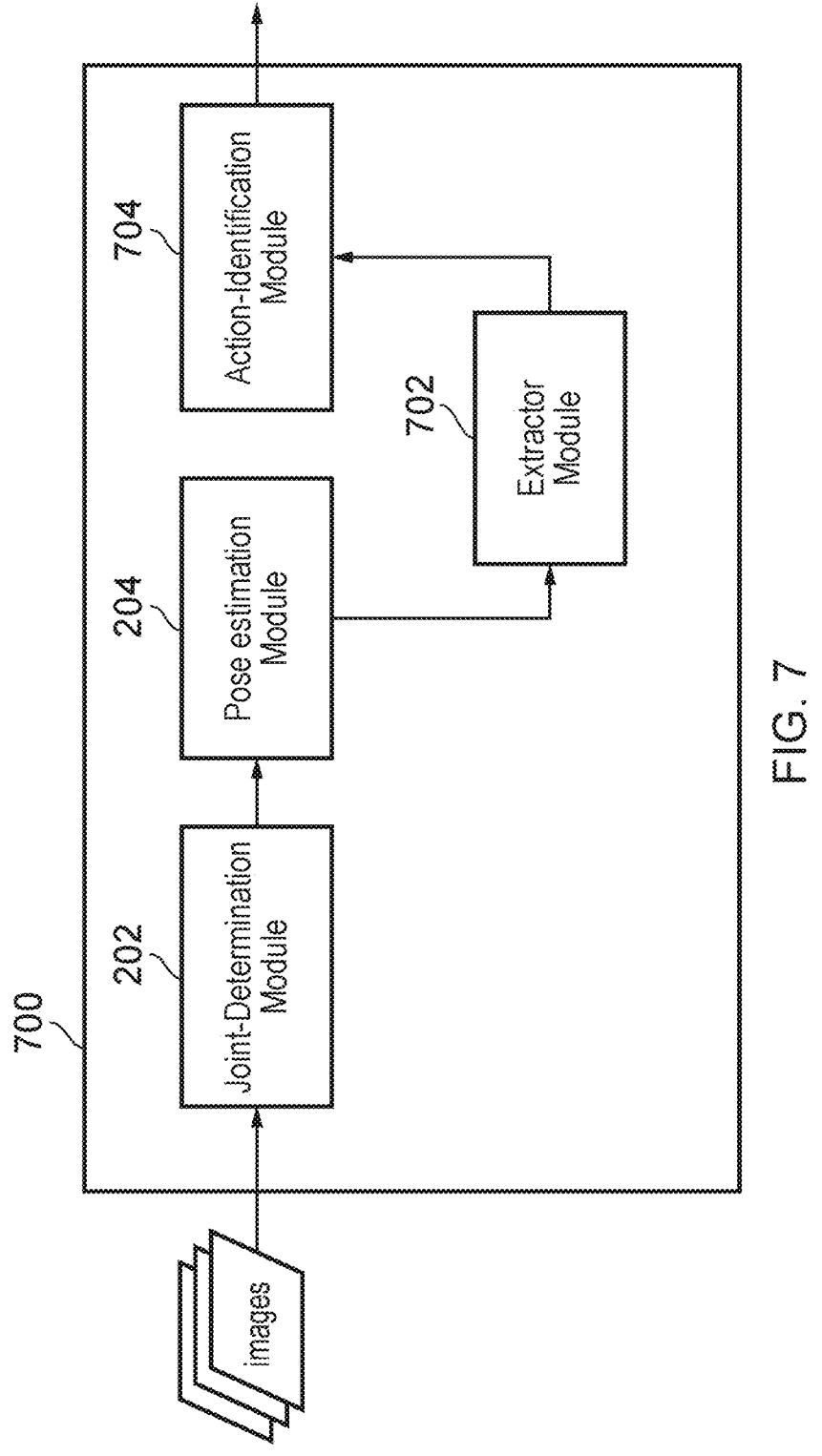
FIG. 7 shows a further example of an apparatus for identifying human actions from images.

FIG. 7 shows a further example of the apparatus 104, labelled here as 700 for clarity. The apparatus 700 comprises a joint determination module 202 and pose-estimation module 204, an extractor module 702 and an action-identification module 704. The joint-determination module 202 is coupled to the pose-estimation module 204. An output of the pose-estimation module is coupled to an input of the extractor module 702, and an output of the extractor module is coupled to an input of the action-identification module 704. The joint-determination module 202 and the pose-estimate module 204 operate in the same manner as those modules in apparatus 104 of FIG. 2, and so the description of their operation will not be provided here. Action-identification module 704 operates in a different way to action-identification module 208, and will be described in more detail below.

Figure 9:
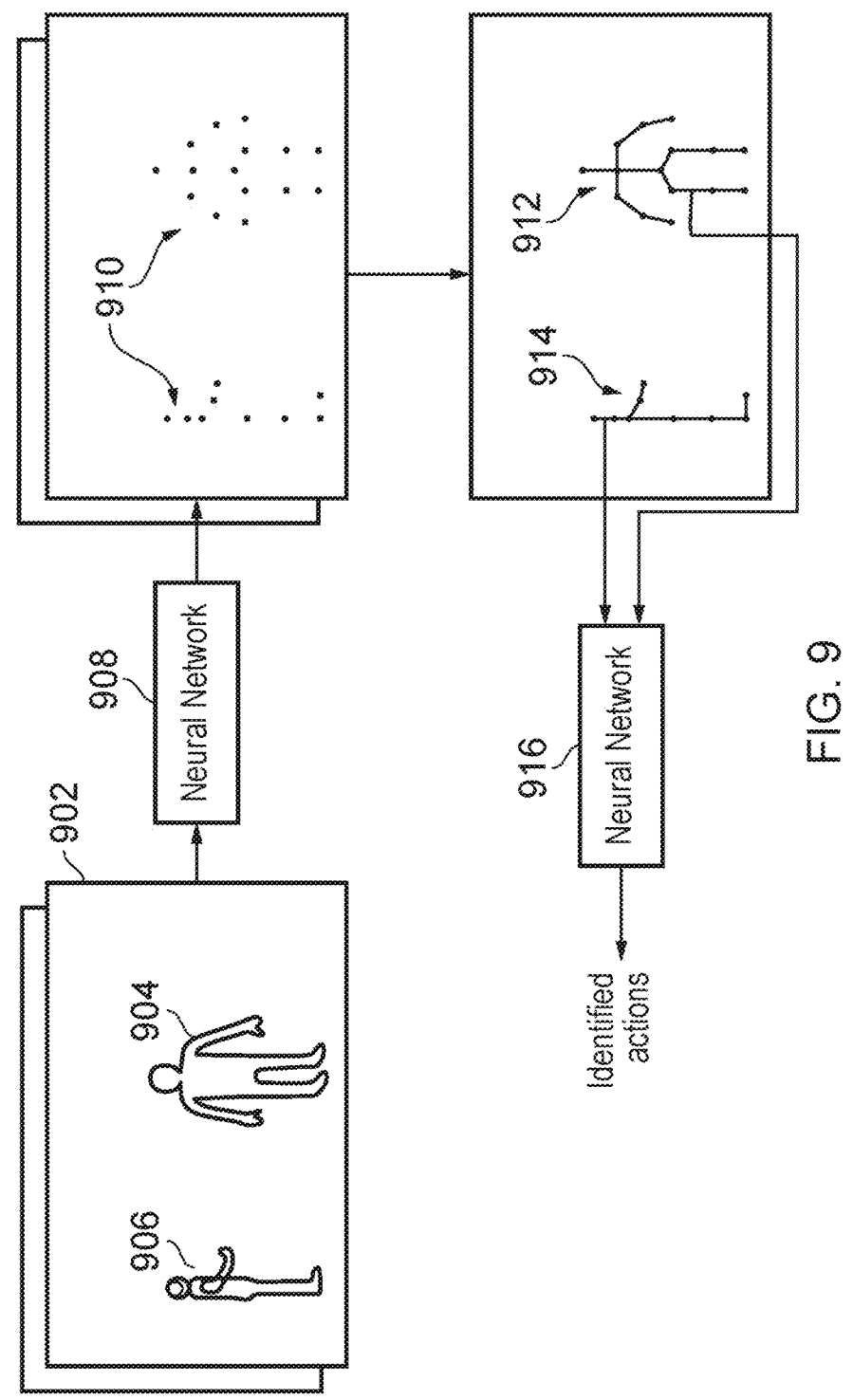
FIG. 9 shows a schematic illustration of how one or more images can be processed to detect a human action from an image in accordance with the second method.

The operation of apparatus 700 to identify a human action from one or more received digital images will now be described with reference to the flowchart in FIG. 8 and the diagram in FIG. 9.

At step 800, the apparatus 700 receives one or more digital images. The one or more images are received from one of the cameras 102 (e.g. camera 102₁). Each of the one or more images may contain one or more people. The one or more input images are shown in FIG. 9 at 902, and depict two people 904 and 906.

At step 802, the joint-determination module 202 analyses the one or more images 902 using a computational neural network 908 to determine for each image a set of candidate joints for the people depicted in the one or more images. The computational neural network may be a convolutional neural network, or some other type of neural network. In the case of multiple images, the joint determination module may analyse each image in turn using the computational neural network to determine a set of candidate joints for each image. The joint-determination module 202 operates to determine the set of joint candidates for each of the one or more images in the same manner as that described above with reference to step 302 of FIG. 3.

The set of candidate joints, D, for an image i of the one or more images 902 may be denoted Di. A set of candidate joints for one image of the one or more images 902 are illustrated in FIG. 9 at 910.

At step 804, the pose-estimation module 204 derives for each image i pose estimates from the set of candidate joints Di for the people depicted in the image. That is, for each of the one or more images, the pose-estimation module 204 derives pose estimates for the one or more people depicted in that image using the associated set of candidate joints Di determined from that image at step 802. The pose-estimation module 204 operates to determine the pose estimates for each of the one or more images in the same manner as that described above with reference to step 304 of FIG. 3. The pose estimates for people 904 and 906 are illustrated in FIG. 9 at 912 and 914 respectively.

The pose estimates may then be output from the pose-estimation module 204 to the extractor module 702.

At step 806, the extractor module 702 extracts from each pose estimate values for a set of one or more parameters that characterise that pose estimate. In the case that there are multiple images in the one or more images 902, the extractor module 702 may extract a set of values for the parameters from the pose estimates for each image. The parameters may characterise a pose estimate in the sense that they contain information on certain distinctive features of the pose estimate, and enable one pose estimate to be distinguished from another, both within the same image and across different images.

The set of parameters could relate to a specific subset of joints of the pose estimates. That subset of joints could be a single joint, a pair of joints, or other numbers of joints. The subset of joints could be all the joints of the pose estimate.

The set of parameters that characterise a pose estimate could include, for example: joint positions for a specified subset of joints of the pose estimate (e.g., screen coordinates or x, y, z coordinates with respect to a scene coordinate system); joint angles for specified joints of the pose estimate (e.g. the ankle joint, knee joint, elbow joint etc.); or the distance between specified pairs of joints of the pose estimate (e.g. the distance between the left knee and the left hip). The parameters could additionally include the joint velocity of specified joints of the pose estimate. The joint velocity may be determined from knowledge of the position of the joint in different images and the time interval between the capture of those images.

The extractor module 702 may be able to extract values for the parameters characterising the pose estimate using only the pose estimates derived by the pose-estimation module 204.

The extractor module 702 communicates the values of the set of parameters extracted from the pose estimates of the one or more images 902 to the action-identification module 704.

At step 808, the action-identification module 704 analyses the derived pose estimates using a computational neural network to identify an action performed by a person depicted in the one or more images 902. The computational neural network used by the module 704 is shown in FIG. 9 at 916.

The action-identification module 704 may analyse the derived pose estimates by analysing the parameter values for the set of parameters that characterise the pose estimates. Thus, the action-identification module 702 may use the computational neural network 916 to identify an action performed by a person in dependence (e.g. using) the parameter values.

The action-identification module 704 may analyse the pose estimates from a single image or from a series of images in order to identify a specified human action performed by a person in the image(s).

In the case of a single image 902, the neural network 916 used by the module 704 may be a non-recurrent neural network, such as a convolutional neural network. The convolutional neural network may receive as its inputs the values of the parameters characterising the pose estimates in the image. The output of the neural network 916 could be an M-dimensional vector where each element of the vector corresponds to a categorised human action from a class of M actions. The value of each element of the vector may denote a probability that the corresponding human action is being performed by a person in the image 902. The values output by the neural network 916 could be binary values (e.g. the output could be in the form of a classification label for the set of M actions), or regression values (e.g. continuous values within a specific range, such as 0 to 1). Thus, the convolutional neural network can be used to identify a specified human action of a person depicted in the image from the values of the parameters characterising their pose estimate. This is because certain values of the parameters may be indicative of certain actions.

For example, the angle of the elbow and shoulder joints of a pose estimate (as specified by the parameters received from the extractor module 702) may be used to determine that a person depicted in the image is scanning an item for sale.

If an image contains multiple pose estimates (as in the present example), the action-identification module 704 may be configured to analyse each pose estimate in turn to identify whether a person in the image is performing a specified action. For example, the neural network 916 may operate on the parameters of each pose estimate in sequential fashion to produce sequential output vectors. In this way, multiple actions (associated with multiple people) may be identified from a single image. Alternatively, the output of the neural network 916 could be in the form of an N×M matrix, or an M×N matrix. Each column, or row, of the matrix may correspond to a respective person, or pose estimate. The elements in a given row or column may then correspond to a categorised human action from the set of M actions for that pose estimate, or person.

Alternatively, the action-identification module 704 may identify a specified action from a series of multiple (i.e. two or more) images 902.

The action-identification module 704 may identify a specified action performed by a person depicted in the series of images from changes in their pose estimate (e.g. 912 and 914) over the series of images. For instance, the specified action may be identified from the change in the parameter values characterising a pose estimate over the sequence of images.

The parameter values of a pose estimate for a sequence of images may be analysed by the neural network 916, which in this case may be a recurrent neural network. The use of a recurrent neural network enables a continuous classification of behaviours (or continuously updated regression values to be generated), which is appropriate if the classification is being assessed over a number of temporally separate images. The neural network 916 could for example be a long-short term memory (LSTM) network. The inputs into the recurrent neural network could be the parameter values for a given pose estimate for the series of images. The parameter values for each image may be input into the network sequentially. As described above, the output of the neural network may be a vector, or matrix (e.g. if the images contain multiple pose estimates). The use of an LSTM network to analyse the pose estimates may be particularly advantageous due to the multiple layers of non-linear functions that can be implemented within the network. This enables LSTM networks to model more complex and non-linear systems compared to other types of network, such as support vector machine (SVM) networks. In addition, the recurrent nature of LSTM networks may enable more accurate modelling of the temporal aspect of the sequence of images.

If each of the multiple images contains multiple pose estimates (as in this example with pose estimates 912 and 914), each pose estimate may be analysed by the module 704 over the series of images in turn (e.g. based on changes in that pose estimate over the series of images). In this way, multiple specified actions (each performed by a respective person depicted in the images) may be identified from the images.

The action-identification module 704 then outputs an indication of the specified actions identified from the one or more images. The output may contain an indication of: the specified action(s) identified from the one or more images; and an indication of the images (e.g. an image ID, such as image number) from which the actions have been identified.

At step 810, the output from the apparatus 700 is communicated to the security server 108. The security server 108 may use the output in a manner described above.

In the alternative implementations, the step of extracting the parameter values from the pose estimate may form part of the step of deriving the pose estimates. Thus, the apparatus 700, in some examples, may not include a dedicated extractor module, with the parameters of the pose estimate (e.g. joint position) being determined by the pose-estimation module 204 as it derives the pose estimates. For example, the action-identification module 704 may identify an action from the joint positions of the pose estimates determined by the pose-estimation module.

The above examples describe how a specified human action from a class of actions may be identified from one or more images. In the above examples, the images received by the apparatus 104 are from a single camera 1022. It will be appreciated that this is merely an example and that the apparatus may be capable of analysing images received from multiple cameras (e.g. 1022, 1023, 1024) simultaneously. The apparatus may identify one type of action (e.g. scanning an item) from the class of actions from images captured from one camera (e.g. a camera located above a point-of-sale), and another type of action from the class (e.g. selecting an item for purchase) from images captured from another camera (e.g. a camera located in the aisles of the store).

It will also be appreciated that, whilst the examples described herein have been in the context of detecting a person's behaviour in a store, this is merely for illustration and that the techniques described herein are applicable to a wide variety of contexts and capable of a variety of implementations. The actions capable of being detected from the images may be selected during training of the neural networks and could include, for example, sporting movements (kicking or throwing a ball, performing a tennis serve, performing a golf swing etc.), carrying weapons (e.g. for use in surveillance and security systems), aggressive movements (punching, kicking etc.) and so on.

The apparatus 104 and 700 is shown as comprising a number of functional blocks. This is schematic only and is not intended to define a strict division between different logic elements of such entities. Each functional block may be provided in any suitable manner. It is to be understood that intermediate values described herein as being formed by a particular module need not be physically generated by the module at any point and may merely represent logical values which conveniently describe the processing performed by the module between its input and output.

The modules described herein may be configured to perform any of the methods described herein. Generally, any of the functions, methods, techniques or components described above can be implemented in software, firmware, hardware (e.g., fixed logic circuitry), or any combination thereof. The terms "module," "element", "unit", "block" and "logic" may be used herein to generally represent software, firmware, hardware, or any combination thereof. In the case of a software implementation, the module, element, unit, block or logic represents program code that performs the specified tasks when executed on a processor. The algorithms and methods described herein could be performed by one or more processors executing code that causes the processor(s) to perform the algorithms/methods. The code may be stored on a non-transitory computer-readable storage medium. Examples of a non-transitory computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A computer-implemented method of performing image analysis to identify human actions represented in a sequence of images, the method comprising:

analyzing the sequence of images depicting one or more people using a first computational neural network to determine a set of joint candidates for the one or more people depicted in the sequence of images;

deriving pose estimates from the set of joint candidates that estimate a body configuration for the one or more people depicted in the sequence of images; and identifying an action performed by a person depicted in the sequence of images according to a region of interest within the sequence of images identified from the derived pose estimates that is analyzed using a recursive neural network.

2. The computer-implemented method of claim 1, further comprising:

extracting, from each derived pose estimate, values for a set of one or more parameters characterizing the pose estimate; and using the recursive neural network to identify an action performed by a person depicted in the one or more images in dependence on the extracted parameter values.

3. The computer-implemented method of claim 2, wherein the set of one or more parameters comprises at least one of: joint position for specified joints; joint angles between specified connected joints; joint velocity for specified joints; and a distance between specified pairs of joints.

4. The computer-implemented method of claim 3, wherein the one or more images is a series of multiple images, and wherein the action performed by the person depicted in the series of images is identified from changes in their derived pose estimate over the series of images.

5. The computer-implemented method of claim 4, further comprising identifying the action performed by the person depicted in the series of images from changes in their derived pose estimate over the series of images, wherein the recursive neural network identifies an action performed by the person from the change in the extracted parameter values characterizing their derived pose estimate over the series of images.

6. The computer-implemented method of claim 1, wherein each image of the one or more images depicts a plurality of people, and derived pose estimates are analyzed for each of the plurality of people for the one or more images using the recursive neural network and to identify an action performed by each person depicted in the one or more images.

7. The computer-implemented method of claim 1, wherein the first computational neural network analyzes the region of interest within the sequence of images on a pixel-by-pixel basis.

8. The computer-implemented method of claim 7, wherein the first computational neural network generates an output vector containing a number of elements, each element within the number of elements storing a probability that a respective pixel within the image depicts a joint, and wherein the output vector is evaluated to determine the set of candidate joints.

9. The computer-implemented method of claim 1, wherein the region of interest defines a sub-region of the sequence of images, and wherein only the sub-region of the sequence of images is analyzed using the recursive neural network.

10. The computer-implemented method of claim 9, wherein the sub-region of the sequence of images is analyzed on a pixel-by-pixel basis.

11. The computer-implemented method of claim 1, wherein the region of interest within the sequence of images is analyzed to identify objects of a specified object class, and to identify the action in response to detecting an object of the specified class in the region of interest.

12. The computer-implemented method of claim 1, further comprising identifying the region of interest within the sequence of images from the derived pose estimates.

13. The computer-implemented method of claim 12, wherein the region of interest bounds a specified subset of joints of a derived pose estimate.

14. The computer-implemented method of claim 12, wherein the region of interest bounds one or more derived pose estimates.

15. The computer-implemented method of claim 12, further comprising:

identifying a region of interest within the sequence of images that bounds terminal ends of a derived pose estimate; and analyzing the identified region of interest that bounds terminal ends of the derived pose estimate using the recursive neural network to identify whether the person depicted in the sequence of images is holding an object of a specified class or not.

16. The computer-implemented method of claim 1, further comprising identifying the action from a class of actions including: scanning an item at a point-of-sale; and selecting an item for purchase.

17. The computer-implemented method of claim 1, wherein the first computational neural network is a convolutional neural network.

* * * * *